(12) United States Patent
Maruyama et al.

(10) Patent No.: US 9,494,172 B2
(45) Date of Patent: Nov. 15, 2016

(54) VEHICLE BRAKE DEVICE

(71) Applicants: ADVICS CO., LTD., Kariya (JP); TOYOTA JIDOSHA KABUSHIKI KAISHA, Toyota-shi (JP)

(72) Inventors: Masaki Maruyama, Nagoya (JP); Yoshio Masuda, Kariya (JP); Akitaka Nishio, Kariya (JP); Kiyoyuki Uchida, Konan (JP); Masaaki Komazawa, Miyoshi (JP); Akira Sakai, Toyota (JP); Yasuji Mizutani, Toyota (JP); Yusuke Kamiya, Okazaki (JP)

(73) Assignee: ADVICS CO., LTD., Aichi-Pref, Kariya-Shi (JP)

(*) Notice: Subject to any disclaimer, the term of this patent is extended or adjusted under 35 U.S.C. 154(b) by 906 days.

(21) Appl. No.: 13/850,041

(22) Filed: Mar. 25, 2013

(65) Prior Publication Data

US 2013/0255249 A1 Oct. 3, 2013

(30) Foreign Application Priority Data

Mar. 30, 2012 (JP) ................................. 2012-082513

(51) Int. Cl.
| | |
|---|---|
| *B60T 13/66* | (2006.01) |
| *F15B 15/02* | (2006.01) |
| *B60T 7/04* | (2006.01) |
| *B60T 13/14* | (2006.01) |
| *B60T 13/68* | (2006.01) |

(52) U.S. Cl.
CPC ............... *F15B 15/02* (2013.01); *B60T 7/042* (2013.01); *B60T 13/146* (2013.01); *B60T 13/662* (2013.01); *B60T 13/686* (2013.01)

(58) Field of Classification Search
CPC .... B60T 13/745; B60T 13/662; B60T 7/042; B60T 13/686
See application file for complete search history.

(56) References Cited

U.S. PATENT DOCUMENTS

2008/0229741 A1* 9/2008 Isono ..................... B60T 7/042
60/581

FOREIGN PATENT DOCUMENTS

| JP | 2003083373 A | | 3/2003 |
| JP | 2009107481 A | * | 5/2009 |
| JP | 2012-016984 A | | 1/2012 |

OTHER PUBLICATIONS

U.S. Appl. No. 13/840,018, Advics Co., Ltd.

(Continued)

*Primary Examiner* — Thomas E. Lazo
*Assistant Examiner* — Abiy Teka
(74) *Attorney, Agent, or Firm* — Buchanan Ingersoll & Rooney PC

(57) ABSTRACT

A vehicle brake device is provided with a master cylinder, a master piston slidably arranged in the master cylinder, an input piston slidably arranged in the master cylinder to be separated from the master piston and defining a separation chamber, an input piston moving amount detecting section for detecting the moving amount of the input piston, a master piston moving amount calculating section for calculating the moving amount of the master piston based on the moving amount of the input piston, and a contact inferring section for inferring the contact of the input piston with the master piston based on the moving amount of the input piston and the moving amount of the master piston.

12 Claims, 8 Drawing Sheets

(56) References Cited

OTHER PUBLICATIONS

U.S. Appl. No. 13/777,795, Advics Co., Ltd.

Japanese Office Action (Notice of Rejection Reasons) dated Jul. 1, 2014, issued in corresponding Japanese Patent Application No. 2012-082513 and an English Translation there of the Japanese Office Action.

\* cited by examiner

Cylinder Opening Side ←————→ Cylinder Bottom Side

VEHICLE BRAKE DEVICE

INCORPORATION BY REFERENCE

This application is based on and claims priority under 35 U.S.C. 119 with respect to Japanese patent application No. 2012-082513 filed on Mar. 30, 2012, the entire content of which is incorporated herein by reference.

BACKGROUND OF THE INVENTION

1. Field of the Invention

The present invention relates to a vehicle brake device for applying a brake force to a vehicle.

2. Discussion of the Related Art

Heretofore, as one example of vehicle brake devices that apply a brake force to a vehicle, there is known a hybrid vehicle brake device described in, for example, JP2012-16984 A. In the vehicle brake device, an input piston and a master piston are held to be separated with a predetermined space therebetween. Then, the moving amount of the input piston is detected, a demand brake force is calculated from the moving amount of the input piston, and a demand friction brake force is calculated by subtracting a regenerative brake force from the demand brake force. A servo pressure that is generated based on the demand friction brake force by the cooperation between an accumulating section (accumulator) and a linear valve is applied to a master cylinder, and hence, the master piston is moved to generate a master pressure. The master pressure is applied to wheel cylinders, whereby a friction brake force depending on the master pressure is generated.

In the vehicle brake device described in the Japanese application, there is a possibility that the input piston contacts the master piston when a brake pedal is stepped on quickly. When the input piston contacts the master piston, a stepping force from the input piston, in addition to the aforementioned servo pressure, acts on the master piston. This results in generating a master pressure exceeding the master pressure that is to be generated in dependence on the demand friction brake force.

While an ABS (antilock brake system) is in operation, the slipping of wheels is prevented by regulating the master pressure with the regenerative brake force set to zero. Heretofore, an inferred master pressure has been calculated from the moving amount or the like of the input piston, and the ABS has been controlled based on the inferred master pressure. However, as aforementioned, since an excessive master pressure is generated when the input piston contacts the master piston, deviation takes place between an actual master pressure and the inferred master pressure, hindering the control of the ABS. If the contact of the input piston with the master piston is inferred, such can be utilized in inferring the master pressure. Then, if it is done to accurately infer respective master pressures that are generated respectively when the input piston and the master piston are held in a separation state and a contact state, it becomes possible to enhance the performance in the brake control by the ABS or the like.

SUMMARY OF THE INVENTION

It is therefore an object of the present invention to provide a vehicle brake device capable of inferring the contact of an input piston with a master piston in a vehicle brake device wherein the input piston and the master piston are held in a separation state.

According to the present invention in a first aspect, there is provided a vehicle brake device for supplying brake fluid to a wheel cylinder of a friction brake provided for a wheel to generate a friction brake force by the friction brake. The vehicle brake device comprises a master cylinder; a master piston arranged in the master cylinder slidably in an axial direction and composed of a pressurizing piston portion defining together with an internal surface of the master cylinder a master chamber for pressurizing the brake fluid supplied to the wheel cylinder, a servo pressure receiving portion defining together with the internal surface of the master cylinder a servo chamber filled with the brake fluid, and a protruding portion protruding rearward from a rear end of the pressurizing piston portion; an input piston arranged at a rear part in the master cylinder slidably in the axial direction, being behind the protruding portion to be separated from the protruding portion, and defining together with the internal surface of the master cylinder and the protruding portion a separation chamber filled with the brake fluid; an input piston moving amount detecting section that detects the moving amount of the input piston; a servo pressure generating section that generates a servo pressure acting in the servo chamber, in dependence on the moving amount of the input piston detected by the input piston moving amount detecting section; a master piston moving amount calculating section that calculates the moving amount of the master piston based on the moving amount of the input piston detected by the input piston moving amount detecting section; and a contact inferring section that infers the contact of the input piston with the protruding portion based on the moving amount of the input piston detected by the input piston moving amount detecting section and the moving amount of the master piston calculated by the master piston moving amount calculating section.

As a result of repetitive experiments on vehicle brake devices, the inventors of the present invention have found out that the moving amount of the master piston can be calculated based on the moving amount of the input piston. That is, since the servo pressure is generated based on the moving amount of the input piston and acts in the servo chamber to move the maser piston and hence, brake fluid is supplied from the master chamber to the wheel cylinder, it is possible to calculate the supply quantity of the brake fluid from the master chamber to the wheel cylinder. Then, it becomes possible to calculate the moving amount of the master piston from the supply quantity of the brake fluid.

Therefore, with the aforementioned construction of the present invention in the first aspect, the master piston moving amount calculating section can calculates the moving amount of the master piston based on the moving amount of the input piston, and the contact inferring section can infer the contact of the input piston with the master piston based on the moving amount of the master piston and the moving amount of the input piston. Accordingly, it becomes possible to infer the contact of the input piston with the master piston without providing an additional sensor.

According to the present invention in a second aspect, there is provided a vehicle brake device for supplying brake fluid to a wheel cylinder of a friction brake provided for a wheel to generate a friction brake force by the friction brake. The vehicle brake device comprises a master cylinder; a master piston arranged in the master cylinder slidably in an axial direction and composed of a pressurizing piston portion defining together with an internal surface of the master cylinder a master chamber for pressurizing the brake fluid supplied to the wheel cylinder, a servo pressure receiving portion defining together with the internal surface of the master cylinder a servo chamber filled with the brake fluid, and a protruding portion protruding rearward from a rear end of the pressurizing piston portion; an input piston arranged at a rear part in the master cylinder slidably in the axial direction, being behind the protruding portion to be separated from the protruding portion, and defining together with the internal surface of the master cylinder and the protruding portion a separation chamber filled with the brake fluid; an input piston moving amount detecting section that detects the moving amount of the input piston; a reaction force generating unit that communicates with the separation chamber and that generates a reaction force pressure depending on the moving amount of the input piston; a servo pressure generating section that generates a servo pressure acting in the servo chamber, in dependence on the moving amount of the input piston detected by the input piston moving amount detecting section; a reaction force pressure detecting section that detects the reaction force; a servo pressure detecting section that detects the servo pressure; and a contact inferring section that infers the contact of the input piston with the protruding portion based on the reaction force pressure detected by the reaction force pressure detecting section and the servo pressure detected by the servo pressure detecting section.

As a result of repetitive experiments on vehicle brake devices, the inventors of the present invention have also found out that when the driver quickly steps on a brake pedal, the servo pressure does not follow the increase of the reaction force pressure. That is, the reaction force pressure in the separation chamber to which the input piston is exposed rises quickly with the movement of the input piston, whereas in the servo pressure generating section that generates the servo pressure with the detection of the movement of the input piston, the servo pressure does not follow the increase of the reaction force pressure due to a response delay in the increase of the servo pressure. Then, it has been found out that when the servo pressure does not follow the increase of the reaction force pressure, the input piston comes close to the master piston. That is, the increase of the reaction force pressure means the movement of the input piston, and the increase of the servo pressure means the movement of the master piston. Therefore, when the servo pressure does not follow the increase of the reaction force pressure, the master piston does not move to follow the movement of the input piston, so that the input piston comes close to the master piston.

Therefore, with the aforementioned construction of the present invention in the second aspect, the contact inferring section can infer the input piston coming close to or contacting the master piston, based on the reaction force pressure and the servo pressure. Accordingly, it becomes possible to infer the contact of the input piston with the master piston without providing an additional sensor.

According to the present invention in a third aspect, in the vehicle brake device of the construction defined in each of the first and second aspects, a first distance reference from which the input piston is inferred to have changed from the contact with the master piston to the separation from the master piston is set to be larger than a second distance reference from which the input piston is inferred to have changed from the separation from the master piston to the contact with the master piston. With this construction in the third aspect, it can be prevented that the contact and separation of the input piston with respect to the master piston are inferred frequently and repetitively after the contact of the input piston with the master piston.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENT (Description of Hybrid Vehicle)

Hereinafter, an embodiment of the present invention will be described with reference to the drawings. A hybrid vehicle (hereafter referred to simply as vehicle) which is equipped with a friction brake device B (vehicle brake device) in the present embodiment is a vehicle that drives driving wheels such as, for example, left and right front wheels Wfl, Wfr by an engine and a motor generator (both not shown). The motor generator constitutes a regenerative brake device. The regenerative brake device is for generating by the motor generator a regenerative brake force depending on a target regenerative brake force referred to later. The motor generator can take a construction that a motor and a generator are provided independently.

In the vicinities of respective wheels Wfl, Wfr, Wrl, Wrr, there are provided brake discs that rotate bodily with the respective wheels Wfl, Wfr, Wrl, Wrr, and friction brakes that press brake pads on the brake discs to generate a frictional brake force. The friction brakes are provided with wheel cylinders WCfl, WCfr, WCrl, WCrr that press the brake pads on the brake discs at a master pressure generated by a master cylinder 1 (FIG. 1) referred to later. Wheel speed sensors (all not shown) are respectively provided in the vicinities of the respective wheels Wfl, Wfr, Wrl, Wrr and output to a brake ECU 6 pulse signals of the frequencies that correspond to the rotational speeds of the respective wheels Wfl, Wfr, Wrl, Wrr.

(Description of Vehicle Brake Device)

Figure 1:
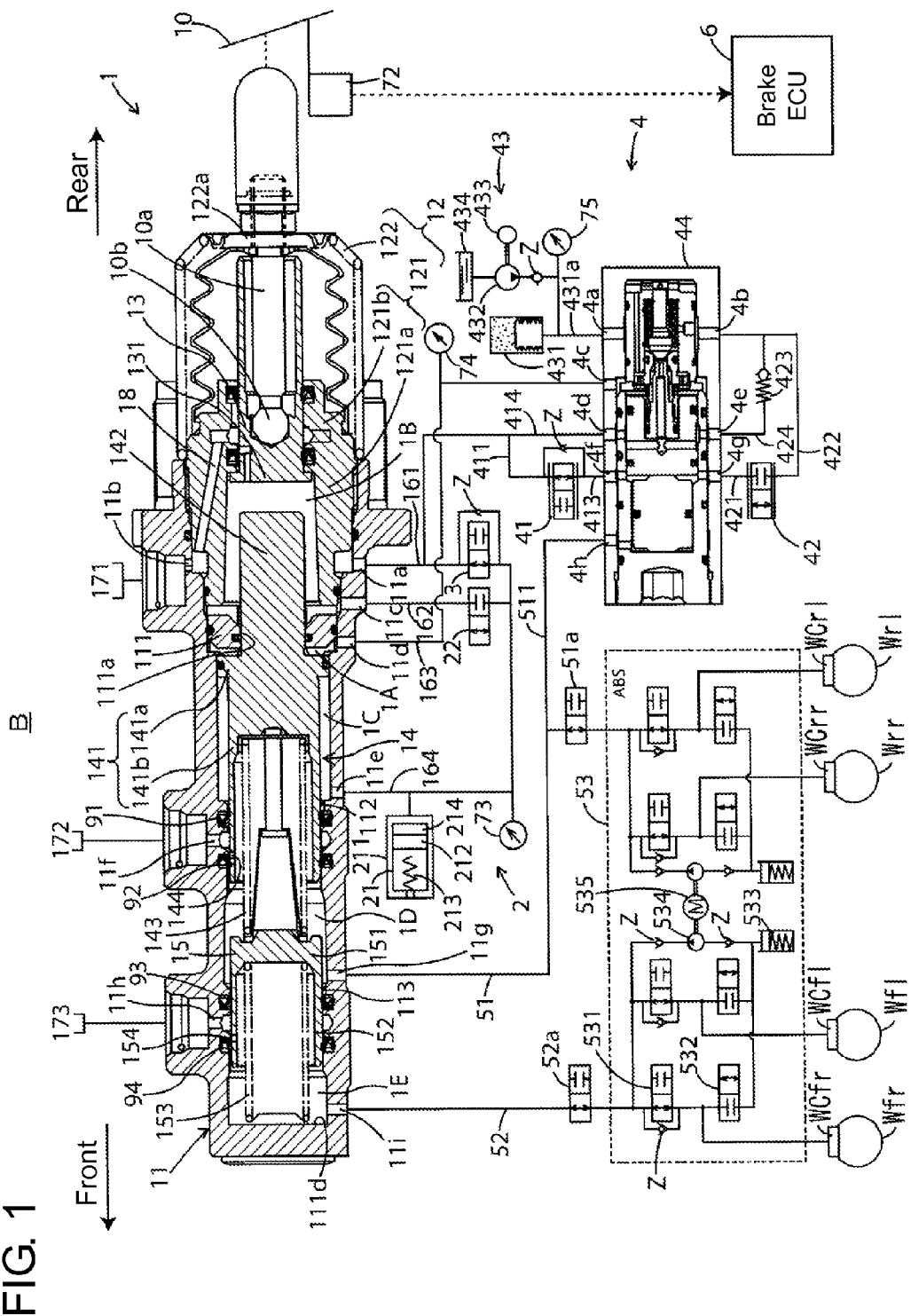
FIG. 1 is a view partly in section showing the construction of a vehicle brake device in an embodiment according to the present invention.

As shown in FIG. 1, the friction brake device B (vehicle brake device) in the present embodiment is provided mainly with the master cylinder 1, a reaction force generating unit 2, a separation locking valve 22, a reaction force valve 3, a servo pressure generating device 4, an ABS 53, the brake ECU 6, and various sensors 72-75 being able to communicate with the brake ECU 6.

(Description of Master Cylinder)

As shown in FIG. 1, the master cylinder 1 is for supplying brake fluid to the wheel cylinders WCfl, WCfr, WCrl, WCrr through the ABS 53 and is composed mainly of a main cylinder 11, a cover cylinder 12, an input piston 13, a first master piston 14, and a second master piston 15.

The main cylinder 11 is a generally cylindrical, bottomed cylinder having an opening at one end and a bottom surface at the other end. Hereinafter, regarding the master cylinder 1, description will be made by referring the opening side of the main cylinder 11 as rear side and the bottom surface side (closed end side) of the main cylinder 11 as front side. The main cylinder 11 is provided inside with a middle wall 111 that separates the opening side (rear side) of the main cylinder 11 from the bottom surface side (front side) thereof. In other words, at a middle portion in the axial direction of the internal surface of the main cylinder 11, the middle wall 111 is formed to protrude radially inward from the internal surface over the whole circumference. An internal surface of the middle wall 111 is defined as a through hole 111*a* passing therethrough in the axial direction (front-rear direction).

Further, in the interior of the main cylinder 11, a small-diameter portion 112 and a small-diameter portion 113 each reduced in inside diameter are provided on the front side of the middle wall 111. That is, each of the small-diameter portions 112, 113 protrude radially inward from the whole circumference of the internal surface of the main cylinder 11 at a part in the axial direction. In the interior of the main cylinder 11, both of the master pistons 14, 15 referred to later in detail are arranged slidably in the axial direction. Ports and the like that make the inside communicate with the outside will be described later.

The cover cylinder 12 has a generally cylindrical cylinder portion 121 and a cup-shape cover portion 122. The cylinder portion 121 is arranged on the rear end side of the main cylinder 11 and is coaxially fitted in the opening of the main cylinder 11. The cylinder portion 121 has a front part 121*a* being larger in inside diameter than a rear part 121*b*. Further, the inside diameter of the front part 121*a* is larger than that of the through hole 111*a* of the middle wall 111.

The cover portion 122 is assembled to the rear end portion of the main cylinder 11 and the external surface of the cylinder portion 121 so as to close the opening of the main cylinder 11 and a rear end opening of the cylinder portion 121. The cover portion 122 is made of an elastic member stretchable in the axial direction and has a bottom wall urged rearward.

The input piston 13 is a piston that is slidden in the cover cylinder 12 when a brake pedal 10 is operated. Behind a protruding portion 142 referred to later of the first master piston 14, the input piston 13 is arranged to be separated from the protruding portion 142 and to be axially slidable in the cover cylinder 12. The input piston 13 is a generally cylindrical, bottomed piston having a bottom on the front side and an opening on the rear side. A bottom wall 131 constituting the bottom of the input piston 13 is made to be larger in diameter than other parts of the input piston 13. The bottom wall 131 of the input piston 13 is arranged to be urged against the rear end of the front part 121*a* of the cylinder portion 121. The input piston 13 is arranged in the rear part 121*b* of the cylinder portion 121 slidably in the axial direction and fluid-tightly.

In the interior of the input piston 13, an operation rod 10*a* of the brake pedal 10 extends forward from the rear end of the input piston 13. The operation rod 10*a* is coupled to the input piston 13 through a pivot joint 10*b* formed at an extreme end (front end) of the operation rod 10*a*. The operation rod 10*a* protrudes outside through the opening of the input piston 13 and a through hole 122*a* of the cover portion 122 and is connected to the brake pedal 10. The operation rod 10*a* moves to be operated together with the operation of the brake pedal 10 and advances as it compresses the cover portion 122 in the axial direction when the brake pedal 10 is steeped on. In this manner, the brake pedal 10 transmits to the input piston 13 the operation force (stepping force) exerted on itself by the driver. With the advance of the operation rod 10*a*, the input piston 13 also advances.

The first master piston 14 is arranged in the main cylinder 11 on the front side of the input piston 13 slidably in the axial direction. Specifically, the first master cylinder 14 is composed of a first pressurizing piston portion 141 and the protruding portion 142. The first pressurizing piston portion 141 is coaxially arranged in the main cylinder 11 on the front side of the middle wall 111. The first pressurizing piston portion 141 takes a generally cylindrical, bottomed shape having an opening on the front side and a servo pressure receiving portion 141*a* on the rear side. That is, the first pressurizing piston portion 141 is composed of the servo pressure receiving portion 141*a* and a circumference wall portion 141*b*.

The servo pressure receiving portion 141*a* is arranged in the main cylinder 11 on the front side of the middle wall 111 slidably in the axial direction and fluid-tightly. In other words, the servo pressure receiving portion 141*a* is formed at the outer circumferential surface of the first pressurizing piston portion 141 to extend radially outward over the whole circumference. The servo pressure receiving portion 141*a* faces a front end surface of the middle wall 111. The circumference wall portion 141*b* takes a cylindrical shape which is smaller in diameter than the servo pressure receiving portion 141*a* and coaxially extends forward from a front end surface of the servo pressure receiving portion 141*a*. A front part of the circumference wall portion 141*b* is fitted in the small-diameter portion 112 slidably in the axial direction and fluid-tightly. A rear part of the circumference wall portion 141*b* is spaced from the internal surface of the main cylinder 11.

The protruding portion 142 is a columnar portion protruding rearward from the center of a rear end surface of the first pressurizing piston portion 141. The protruding portion 142 is smaller in diameter than the first pressurizing piston portion 141. The protruding portion 142 passes through the through hole 111*a* of the middle wall 111 slidably in the axial direction. A seal member attached at the through hole 111*a* and contacting the external surface of the protruding portion 142 over the whole circumference ensures a fluid-tight fitting between the external surface of the protruding portion 142 and the internal surface of the through hole 111a. A rear part of the protruding portion 142 extends into the interior of the cylinder portion 121 beyond the through hole 111a and is spaced from the internal surface of the cylinder portion 121. A rear end surface of the protruding portion 142 is spaced by a predetermined distance from the bottom wall 131 of the input piston 13. The first master piston 14 is urged rearward by an urging member 143 comprising a spring or the like.

A servo chamber 1A filled with brake fluid is defined by the rear end surface of the servo pressure receiving portion 141a of the first pressurizing piston portion 141, the front end surface of the middle wall 111, the internal surface of the main cylinder 11 on the front side of the middle wall 111 and the external surface of the protruding portion 142. Further, a separation chamber 1B filled with brake fluid is defined by a rear end surface of the middle wall 111, the external surface of the input piston 13, the internal surface of the front part 121a of the cylinder portion 121 and the external surface of the protruding portion 142. Further, a reaction force pressure chamber 1C is defined by a rear end surface of the small-diameter portion 112 (including a seal member 91), the external surface of the circumferential wall portion 141b, a front end surface of the servo pressure receiving portion 141a, and the internal surface of the main cylinder 11.

The second master piston 15 is coaxially arranged in the main cylinder 11 on the front side of the first master piston 14. The second master piston 15 takes a generally cylindrical, bottomed shape having an opening on the front side and a bottom wall (second pressurizing piston portion 151) on the rear side. That is, the second master piston 15 is composed of the second pressurizing piston portion 151 of a columnar shape and a circumferential wall portion 152 protruding forward from the second pressurizing piston portion 151. The second pressurizing piston portion 151 is arranged on the front side of the first master piston 14 and between the small-diameter portions 112, 113 in the axial direction. A rear part including the second pressurizing piston portion 151 of the second master piston 15 is spaced from the internal surface of the main cylinder 11. The circumferential wall portion 152 takes a cylindrical shape and coaxially extends forward from an outer peripheral part of the second pressurizing piston portion 151. The circumferential wall portion 152 is fitted in the small diameter portion 113 slidably in the axial direction and fluid-tightly. The second master piston 15 is urged rearward by an urging member 153 comprising a spring or the like.

A first master chamber 1D is defined by the external surface of the second master piston 15, the front end surface of the first master piston 14, the interior surface of the first master piston 14, the front end surface of the small diameter portion 112 (including a seal member 92), the rear end surface of the small diameter portion 113 (including a seal member 93), and the internal surface of the main cylinder 11 between the small diameter portions 112, 113 (on the front side of the middle wall 111). Further, a second master chamber 1E is defined by an inner bottom surface 111d of the main cylinder 111, a front end surface of the second master piston 15, the interior surface of the second master piston 15, a front end surface of the small diameter portion 113 (including a seal member 94), and the internal surface of the main cylinder 11.

The master cylinder 1 is formed with ports 11a to 11i that make the inside communicate with the outside. The port 11a is formed in the main cylinder 11 behind the middle wall 111. The port 11b is formed at the same axial position as the port 11a to diametrically face the port 11a. The port 11a and the port 11b communicate with each other through an annular space between the internal surface of the main cylinder 11 and the external surface of the cylinder portion 121. The port 11a is connected to a pipe 161, while the port 11b is connected to a reservoir 171. That is, the port 11a communicates with the reservoir 171.

Further, the port 11b communicates with the separation chamber 1B through a passage 18 that is formed in the cylinder portion 121 and the input piston 13. The passage 18 is blocked when the input piston 13 advances. That is, when the input piston 13 advances, the separation chamber 1B is isolated from the reservoir 171.

The port 11c is formed on the front side of the port 11a and makes the separation chamber 1B communicate with a pipe 162. The port 11d is formed on the front side of the port 11c and makes the servo chamber 1A communicate with a pipe 163. The port 11e is formed on the front side of the port 11d and makes the reaction force pressure chamber 1C communicate with a pipe 164.

The port 11f is formed between both of the seal members 91, 92 at the small-diameter portion 112 and makes a reservoir 172 communicate with the interior of the main cylinder 11. The port 11f communicates with the first master chamber 1D through a passage 144 formed across the first master piston 14. The passage 144 is formed at a position slightly behind the seal member 92 so that the port 11f and the first master chamber 1D are blocked when the first master piston 14 advances.

The port 11g is formed on the front side of the port 11f and makes the first master chamber 1D communicate with a pipe 51. The port 11h is formed between both of the seal members 93, 94 and makes a reservoir 173 communicate with the interior of the main cylinder 11. The port 11h communicates with the second master chamber 1E through a passage 154 formed across the second master piston 15. The passage 154 is formed at a position slightly behind the seal member 94 so that the port 11h and the second master chamber 1E are blocked when the second master piston 15 advances. The port 11i is formed on the front side of the port 11h and makes the second master chamber 1E communicate with a pipe 52.

Further, seal members (each indicated by a black dot) such as O-rings or the like are arranged at various parts in the master cylinder 1. The seal members 91, 92 are arranged at the small diameter portion 112 and fluid-tightly contact the external surface of the first master piston 14. Similarly, the seal members 93, 94 are arranged at the small diameter portion 113 and fluid-tightly contact the external surface of the second master piston 15. Further, seal members (not numbered) are also arranged between the input piston 13 and the cylinder portion 121.

The stroke sensor 72 is a sensor arranged in the vicinity of the brake pedal 10 for detecting the operation amount (stepping amount) of the brake pedal 10 and transmits the detection result to the brake ECU 6. Since the brake pedal 10 is coupled to the rear end of the input piston 13, the stroke sensor 72 thus detects the moving amount in the axial direction (the position in the axial direction) of the input piston 13.

(Reaction Force Generating Unit 2)

The reaction force generating unit 2 is provided with a stroke simulator 21. The stroke simulator 21 is a device that produces an operation feeling (stepping feeling) arising in conventional brake devices, by generating a reaction force pressure in the separation chamber 1B and the reaction force pressure chamber 1C in dependence on the operation of the brake pedal 10. Generally, the stroke simulator 21 takes the construction that a piston 212 is slidably fitted in a cylinder 211 and that a pilot fluid chamber 214 is formed on the front side of the piston 212 urged forward by a compression spring 213. The stroke simulator 21 is connected to the reaction force pressure chamber 1C through the pipe 164 and the port 11e and is also connected to the separation locking valve 22 and the reaction force valve 3 through the pipe 164.

(Separation Locking Valve 22)

The separation locking valve 22 is an electromagnetic valve (linear valve) of the normally closed type and is controllable by the brake ECU 6 to be opened or closed. The separation locking valve 22 is connected to the pipes 164, 162 and brings these pipes 164, 162 into connection/disconnection. The separation locking valve 22 is a valve that brings the separation chamber 1B and the reaction force pressure chamber 1C into connection/disconnection. In other words, the separation locking valve 22 is the valve that selectively opens or closes the pipes 162, 164 connecting the separation chamber 1B with the stroke simulator 21.

The pressure sensor 73 is a sensor for mainly detecting the pressure (reaction force pressure) in the separation chamber 1B and the reaction force pressure chamber 1C and is connected to the pipe 164. The pressure sensor 73 detects the pressure in the separation chamber 1B and the reaction force pressure chamber 1C when the separation locking valve 22 is in an opens state, and detects the pressure in the reaction force pressure chamber 1C when the separation locking valve 22 is in a closed state.

(Reaction Force Valve 3)

The reaction force valve 3 is an electromagnetic valve of the normally open type and is controllable by the brake ECU to be opened or closed. The reaction force valve 3 is connected to the pipe 164 and the pipe 161 and brings these pipes 161, 166 into connection/disconnection. The reaction force valve 3 is the valve that brings the separation chamber 1B and the reaction force pressure chamber 1C into connection/disconnection with the reservoir 171.

(Control of Separation Locking Valve 22 and Reaction Force Valve 3)

Description will be made regarding the control by the brake ECU 6 of the reaction force valve 3 and the separation locking valve 22 at the time of a braking operation. When the brake pedal 10 is stepped on, the input piston 13 advances, and the passage 18 is blocked to isolate the separation chamber 1B from the reservoir 171. At the same time, the reaction force valve 3 is brought into a closed state (switches from open position to closed position), and the separation locking valve 22 is brought into the open state (switches from closed position to open position). With the switching of the reaction force valve 3 to the closed state, the reaction force pressure chamber 1C is blocked from the reservoir 171. With the switching of the separation locking valve 22 to the open state, the separation chamber 1B is brought into communication with the reaction force pressure chamber 1C. That is, by the advance of the input piston 13 and with the switching of the reaction force valve 3 to the closed state, the separation chamber 1B and the reaction force pressure chamber 1C are blocked from the reservoir 171. The same fluid quantity as the fluid quantity that is caused by the movement of the master piston 14 to flow into or from the separation chamber 1B flows from or into the reaction force pressure chamber 1C. Thus, the stroke simulator 21 causes a reaction force depending on the stroke amount to be generated in the separation chamber 1B and the reaction force pressure chamber 1C. That is, the stroke simulator 21 applies a reaction force pressure depending on the stroke amount of the input piston 13 (operation amount of the brake pedal 10), to the brake pedal 10 coupled to the input piston 13.

The area of the extreme end surface of the protruding portion 142 is set to be the same as the area of a surface that the servo pressure receiving portion 141a exposes to the reaction force pressure chamber 1C. Thus, when the reaction force valve 3 and the separation locking valve 22 are respectively in the closed state and the open state, the separation chamber 1B and the reaction force pressure chamber 1C have the same pressure therein, and the force that the reaction force pressure in the separation chamber 1B exerts on the extreme end surface of the protruding portion 142 becomes the same as the force that the reaction force pressure in the reaction force pressure chamber 1C exerts on the surface of the servo pressure receiving portion 141a exposed to the reaction force pressure chamber 1C. Therefore, even when the stepping by the driver on the brake pedal 10 causes the interior pressures in the separation chamber 1B and the reaction force pressure chamber 1C to rise, the first master piston 14 does not move. Further, because the area of the extreme end surface of the protruding portion 142 is set to be the same as the area of the surface that the servo pressure receiving portion 141a exposes to the reaction force pressure chamber 1C, no change occurs with the quantity of the fluid that flows into the stroke simulator 21 even if the first master piston 14 moves. As a result, the reaction force pressure in the separation chamber 1B does not change, and the reaction force transmitted to the brake pedal 10 also does not change.

In the present embodiment, the area of the extreme end surface of the protruding portion 142 is set to be the same as the section area of the portion where the input piston 13 passes through the rear part 121b of the cover cylinder 12. Thus, when the reaction force valve 3 and the separation locking valves 22 are respectively in the open state and the closed state and when the separation chamber 1B becomes isolated fluid-tightly, the input piston 13 and the first master 14 becomes the same in the moving amount.

(Servo pressure Generating Device 4)

The servo pressure generating device 4 is provided mainly with a reducing valve 41, a pressure increase valve 42, a pressure supply section 43 and a regulator 44. The reducing valve 41 is an electromagnetic valve of the normally open type and controls the fluid pressure on a downstream passage of the reducing valve 41 by having the opening area of its passage controlled linearly by the brake ECU 6. The reducing valve 41 is connected on one side to the pipe 161 through a pipe 411 and is connected on the other side to a pipe 413. That is, the one side of the reducing valve 41 communicates with the reservoir 171 through the pipes 411, 161 and the ports 11a 11b. The pressure increase valve 42 is an electromagnetic valve of the normally closed type and controls the fluid pressure on a downstream passage of the pressure increase valve 42 by having the opening area of its passages controlled linearly by the brake ECU 6. The pressure increase valve 42 is connected to a pipe 421 on one side and to a pipe 422 on the other side.

The pressure supply section 43 is means for supplying high-pressure brake fluid to the regulator 44 in response to a command from the brake ECU 6. The pressure supply section 43 is primarily composed of an accumulator 431, a hydraulic pump 432, a motor 433 and a reservoir 434.

The accumulator 431 is for accumulating the fluid pressure generated by the hydraulic pump 432. The accumulator 431 is connected to the regulator 44, a pressure sensor 75 and the hydraulic pump 432 through a pipe 431a. The hydraulic pump 432 is driven by the motor 433 to supply the accumulator 431 with the brake fluid stored in the reservoir 434. The pressure sensor 75 detects the pressure in the accumulator 431, and the detection value correlates to a consumed quantity of brake fluid accumulated in the accumulator 431. As one being equivalent to the value correlating to the consumed quantity of brake fluid, there can be used a servo pressure that is increased in pressure by the use of the brake fluid in the accumulator 431, or a reaction pressure that increases with an increase in the servo pressure.

When the pressure sensor 75 detects that the accumulator pressure goes down to a predetermined value or lower, the motor 433 is driven in response to a control signal from the brake ECU 6, and the hydraulic pump 432 supplies brake fluid to the accumulator 431 to replenish the accumulator 431 with pressure energy.

Figure 2:
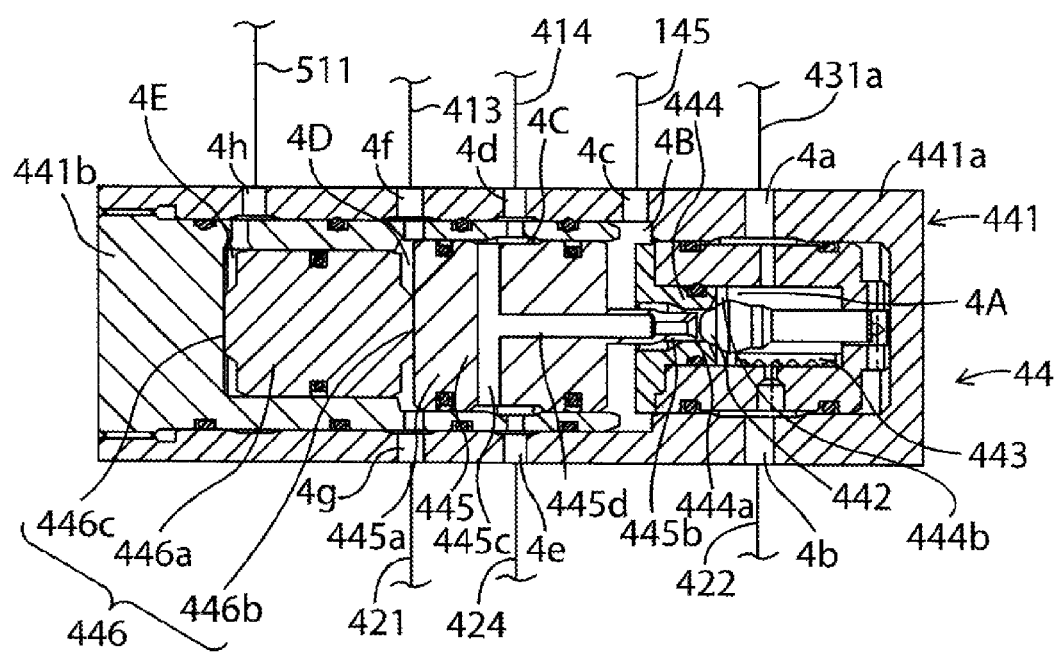
FIG. 2 is a sectional view showing the construction of a regulator in the embodiment.

As shown in FIG. 2, the regulator 44 is constructed by primarily adding a sub piston 446 to a conventional regulator. That is, the regulator 44 is provided mainly with a cylinder 441, a ball valve 442, an urging portion 443, a vale seat 444, a control piston 445, and the sub piston 446.

The cylinder 441 is composed of a bottomed cylinder case 441a of a generally cylindrical shape having a bottom surface on one side (right side in the figure) and a cap member 441b closing an opening (left side in the figure) of the cylinder case 441a. Although the cap member 441b takes a U-shape in the longitudinal section as viewed in FIG. 2, description in the present embodiment will be made to regard the cap member 441b as being cylindrical and to refer a part closing the opening of the cylinder case 441a as the cap member 441b. The cylinder case 441a is formed with a plurality of ports 4a to 4h each making the inside and the outside communicate with each other.

The port 4a is connected to a pipe 431a, the port 4b is connected to the pipe 422, and the port 4c is connected to the pipe 163. The port 4d is connected to the pipe 161 through the pipe 414, the port 4e is connected to a pipe 424 communicating with the pipe 422 through a relief valve 423, the port 4f is connected to the pipe 413, the port 4g is connected to the pipe 421, and the port 4h is connected to a pipe 511 branching from the pipe 51.

The ball valve 442 is a valve taking a ball shape at an end thereof and is arranged in the cylinder 441 on a bottom surface side of the cylinder case 441a (hereafter also referred to as cylinder bottom side) slidably in the lengthwise direction of the cylinder case 441a. The urging portion 443 is a spring member that urges the ball valve 442 toward an opening side of the cylinder case 441a (hereafter also referred to as cylinder opening side), and is provided at the bottom surface of the cylinder case 441a. The valve seat 444 is a wall member provided in the cylinder case 441a and partitions the interior of the cylinder case 441a into the cylinder opening side and the cylinder bottom side. The valve seat 444 is formed at the center thereof with a through passage 444a making the partitioned cylinder opening and bottom sides communicate with each other. A valve seat surface 444b being a conical shape for the ball valve 442 to contact is formed at an opening portion on the cylinder bottom side of the through passage 444a. The ball valve 442 being urged is held in contact with the valve seat surface 444b to close the through passage 444a thereby.

A space that is defined by the ball valve 442, the urging portion 443, the valve seat 444 and the internal surface of the cylinder case 4441a on the cylinder bottom side is defined as first chamber 4A. The first chamber 4A is filled with brake fluid and is connected to a pipe 431a though the port 4a and to the pipe 422 through the port 4b.

The control piston 445 is composed of a body portion 445a of a generally columnar shape and a protrusion 445b of a generally columnar shape being smaller in diameter than the body portion 445a. The body portion 445a is coaxially arranged in the cylinder 441 on the cylinder opening side of the valve seat 444 fluid-tightly and slidably in the axial direction. The body portion 445a is urged by an urging member (not shown) toward the cylinder opening side. A passage 445c extending diametrically (vertically as viewed in FIG. 2) to open on the external surface of the body portion 445a at opposite ends thereof is formed at about the center in cylinder axis direction of the body portion 445a. On the internal surface at a part of the cylinder 441 which part corresponds in position to the openings of the passage 445c, the port 4d is formed and a cavity or depression of a concave shape is formed to define a third chamber 4C together with the body portion 445a.

The protrusion 445b protrudes from the center on the end surface on the cylinder bottom side of the body portion 445a toward the cylinder bottom side. The protrusion 445b is smaller in diameter than the through passage 444a of the valve seat 444. The protrusion 445b is arranged coaxially of the through passage 444a. An end of the protrusion 445b is spaced a predetermine distance from the ball valve 442 toward the cylinder opening side. The protrusion 445b is formed with a passage 445d that opens at the center of an end surface on the cylinder bottom side of the protrusion 445b and that extends in the cylinder axial direction. The passage 445d extends to the inside of the body portion 445a and is connected to the passage 445c.

A second chamber 4B is formed as the space that is defined by the end surface on the cylinder bottom side of the body portion 445a, the external surface of the protrusion 445b, the internal surface of the cylinder 441, the valve seat 444, and the ball valve 442. The second chamber 4B communicates with the ports 4d, 4e through the passages 445d, 445c and the third chamber 4C.

The sub piston 446 is composed of a sub body portion 446a, a first protrusion 446b and a second protrusion 446c. The sub body portion 446a takes a generally columnar shape. The sub body portion 446a is coaxially arranged in the cylinder 441 on the cylinder opening side of the body portion 445a fluid-tightly and slidably in the axial direction.

The first protrusion 446b takes a generally columnar shape being smaller in diameter than the sub body portion 446a and protrudes from the center of the end surface on the cylinder bottom side of the sub body portion 446a. The first protrusion 446b is in contact with the end surface on the cylinder opining side of the body portion 445a. The second protrusion 446c is of the same shape as the first protrusion 446b and protrudes from the end surface on the cylinder opening side of the sub body portion 446a. The second protrusion 446b is in contact with the cap member 441b.

A pressure control chamber 4D is formed as the space that is defined by the end surface on the cylinder bottom side of the sub body portion 446a, the external surface of the first protrusion 446b, the end surface on the cylinder opening side of the control piston 445, and the internal surface of the cylinder 441. The pressure control chamber 4D communicates with the reducing valve 41 through the port 4f and the pipe 413 and also communicates with the pressure increase valve 42 through the port 4g and the pipe 421.

On the other hand, a fourth chamber 4E is formed as the space that is defined by the end surface on the cylinder opening side of the sub body portion 446a, the external surface of the second protrusion 446c, the cap member 441b, and the internal surface of the cylinder 441. The fourth chamber 4E communicates with the port 11g through the port 4h and the pipes 511, 51. The respective chambers 4A to 4E are filled with brake fluid. As shown in FIG. 1, the pressure sensor 74 is a sensor for detecting the pressure (servo pressure) in the servo chamber 1A and is connected to the pipe 163. In the present embodiment, the second chamber 4B (servo pressure generating chamber) and the pressure control chamber 4D (first pilot chamber) respectively have their section areas S1 and S2 formed to be the same, while the fourth chamber 4E (second pilot chamber) is formed to have its section area S3 being smaller than the section areas S1, S2.

(Brake Piping)

The first master chamber 1D and the second master chamber 1E communicate with the wheel cylinders WCrl, WCrr, WCfl, WCfr through the pipes 51, 52, electromagnetic valves 51a, 52a (being the normally open type acting as cut valves well-known in the art), and the ABS 53. Specifically, the port 11g of the first master chamber 1D and the port 11i of the second master chamber 1E are connected to the ABS (antilock brake system) well known in the art respectively through the pipes 51, 52. The ABS 53 is connected to the wheel cylinders WCfl, WCfr, WCrl, WCrr that operate friction brakes to brake the wheels Wfl, Wfr, Wrl, Wrr.

With respect to the ABS 53, the construction for one (e.g., Wfr) of the four wheels will be described typically, while the constructions for the remaining wheels will be omitted from description because they are the same as that for the one wheel (Wfr). For the one wheel Wfr, the ABS 53 is provided with a retention valve 531, a reducing valve 532, a reservoir 533, a pump 534 and a motor 535. The retention valve 531 is an electromagnetic valve of the normally open type and is controllable by the brake ECU 6 to be opened or closed. The retention valve 531 is connected to the pipe 52 on one side and to the wheel cylinder WCfr and the reducing valve 532 on the other side. That is, the retention valve 531 operates as input valve in the ABS for the wheel Wfr.

The reducing valve 532 is an electromagnetic valve of the normally closed type and is controllable by the brake ECU 6 to be opened or closed. The reducing valve 532 is connected to the wheel cylinder WCfr and the retention valve 531 on one side and to the reservoir 533 on the other side. When the reducing valve 532 turns to the open state, the wheel cylinder WCfr is brought into communication with the reservoir 533.

The reservoir 533 stores brake fluid and is connected to the pipe 52 through the reducing valve 532 on one side and through the pump 534 on the other side. The pump 534 is arranged to be connected to the reservoir 533 at a suction port thereof and to the pipe 52 through a check valve Z at a discharge port thereof. The check valve Z permits the flow of fluid from the pump 534 to the pipe 52 (to the second master chamber 1E) but inhibits the fluid flow in the reverse direction. The pump 534 is driven by the motor 53 which is operated in response to a command from the brake ECU 6. At the time of a pressure deducing mode under the ABS control, the pump 534 draws the brake fluid in the wheel cylinder WCfr or the brake fluid stored in the reservoir 533 to return the drawn brake fluid to the second master chamber 1E. For mitigation of the pulsation which arises in the brake fluid discharged in the pump 534, there is arranged a dumper (not shown) on the upstream side of the pump 534.

The ABS 53 is provided with the aforementioned wheel speed sensors (not shown) for detecting wheel speeds. Detection signals detected by the wheel speed sensors and representing the wheel speeds are output to the brake ECU 6.

In the ABS 53 constructed as mentioned above, the brake ECU 6 executes an ABS control (antilock brake control), wherein based on the master cylinder pressure, the states of the wheel speeds and the acceleration in the front-rear direction, the switching of the opening/closing of each electromagnetic valve 531, 532 is controlled and the motor 535 is operated if necessary to adjust the brake fluid pressure applied to the wheel cylinder WCfr, that is, a brake force applied to the wheel Wfr. The ABS 53 is a device (corresponding to a supply fluid pressure adjusting device) that in response to an instruction from the brake ECU 6, adjusts the quantity and the supply timing (i.e., adjusts the master pressure) with respect to the brake fluid supplied from the master cylinder 1 and supplies the adjusted master pressure to each of the wheel cylinders WCfl, WCfr, WCrl, WCrr.

In a linear mode described later, the fluid pressure sent from the accumulator 431 of the servo pressure generating device 4 is controlled by the pressure increase valve 42 and the reducing valve 41 to generate a servo pressure in the servo chamber 1A, whereby the first master piston 14 and the second master piston 15 are advanced to pressurize the first master chamber 1D and the second master chamber 1E. The fluid pressures in the first master chamber 1D and the second master chamber 1E are supplied as master cylinder pressure respectively from the ports 11g, 11i to the wheel cylinders WCrl, WCrr, WCfl, WCfr through the pipes 51, 52, the valves 51a, 52a, and the ABS 53, whereby a hydraulic brake force is applied to each of the wheels Wfl, Wfr, Wrl, Wrr.

(Brake ECU 6)

The brake ECU 6 is an electronic control unit having a microcomputer, which is provided with an input/output interface, a CPU, a RAM and a storage section such as, for example, ROM, non-volatile memory or the like which are mutually connected through a bus (all not shown). The CPU executes programs corresponding to flow charts shown in FIGS. 3, 8 and 9. The RAM temporally stores variables necessary for the execution of the programs. The storage section stores the programs, a program for executing the flow charts shown in FIGS. 3, 8 and 9, and data maps shown in FIGS. 4(A), 4(B) and 5.

The brake ECU 6 communicates with the various sensors 72-75 and controls the respective electromagnetic valves 22, 3, 41, 42, 51a, 52a, 531, 532 and the motors 433, 535. Further, the brake ECU 6 is connected to a hybrid ECU (not shown) to be able to communicate with each other and performs a cooperation control (regenerative cooperation control) so that a demand brake force referred to later becomes the sum of a target regenerative brake force generated by the regenerative brake device and a target friction brake force generated by the friction brake device B. The brake ECU 6 is able to operate in two control modes including a linear mode and a REG mode.

As described later in detail, the linear mode is the mode for an ordinary brake control, in which mode the reducing valve 41 and the pressure increase valve 42 are controlled with the separation locking valve 22 opened and with the reaction force valve 3 closed, to control the servo pressure in the servo chamber 1A. In this linear mode, the brake ECU 6 calculates a demand brake force by the driver from the operation amount of the brake pedal 10 (moving amount of the input piston 13) detected by the stroke sensor 72. Then, the brake ECU 6 outputs the demand brake force by the driver to the hybrid ECU, then acquires from the hybrid ECU a target value, that is, a target regenerative brake force for the regenerative brake device, and calculates a target friction brake force by subtracting the target regenerative brake force from the demand brake force. Then, the brake ECU 6 controls the reducing valve 41 and the pressure increase valve 42 based on the calculated target friction brake force to control the servo pressure in the servo chamber 1A so that the friction brake force by the friction brake device B becomes the target friction brake force. That is, although the demand brake force is calculated based on the moving amount of the input piston 13, the target friction brake force is changed in dependence on the magnitude of the target regenerative brake force, so that the first master piston 14 does not necessarily moves in correspondence to the movement of the input piston 13. When the target regenerative brake force is increased with the demand brake force unchanged, the friction brake force is decreased by the increment of the target regenerative brake force, so that the first master piston 14 comes close to the input piston 13 by a distance corresponding to the decrement of the friction brake force (the increment of the target regenerative brake force).

The REG mode is a mode in which, as described later in detail, the reducing valve 41, the pressure increase valve 42, the separation locking valve 22 and the reaction force valve 3 are brought into a non-conductive state or become a non-conductive state (retention of the ordinary state) due to a failure, malfunction or the like.

(Linear Mode)

In the state that the brake pedal 10 is not being stepped on, the regulator 44 remains in the foregoing state, that is, the state in which the ball valve 442 remains closing the through passages 444*a* of the valve seat 444. Further, the reducing valve 41 is in the open state, and the pressure increase valve 42 is in the closed state. That is, the first chamber 4A and the second chamber 4B remain isolated.

The second chamber 4B is in communication with the servo chamber 1A through the pipe 163, in which state the both chambers are held at the same pressure. The second chamber 4B is in communication with the third chamber 4C through the passages 445*d*, 445*c* in the control piston 445. Thus, the second chamber 4B and the third chamber 4C are in communication with the reservoir 171 through the pipes 414, 161. The pressure control chamber 4D is blocked by the pressure increase valve 42 on one side and is in communication with the reservoir 171 through the reducing valve 41 on the other side. The pressure control chamber 4D and the second chamber 4B are held at the same pressure. The fourth chamber 4E is in communication with the first master chamber 1D through the pipes 511, 51, and hence, the both chambers are held at the same pressure.

When the brake pedal 10 is stepped on in this state, the brake ECU 6 controls the reducing valve 41 and the pressure increase valve 42 based on a target friction brake force. That is, the brake ECU 6 controls the reducing valve 41 in a direction to close the same and controls the pressure increase valve 42 in a direction to open the same.

The opening of the pressure increase valve 42 causes the pressure control chamber 4D to communicate with the accumulator 431. The closing of the reducing valve 41 causes the pressure control chamber 4D to be blocked from the reservoir 171. The fluid pressure (pilot pressure) in the pressure control chamber 4D is increased by the high-pressure brake fluid supplied from the accumulator 431. With an increase in the fluid pressure in the pressure control chamber 4D, the control piston 445 is slidden toward the cylinder bottom side. Then, when the end of the protrusion 445*b* of the control piston 445 comes into contact with the ball valve 442, the passage 445*d* is blocked by the ball valve 442. Thus, the second chamber 4B is blocked from the third chamber 4C and hence, from the reservoir 171.

Further, as the control piston 445 is further slidden toward the cylinder bottom side, the ball valve 442 is pushed by the protrusion 445*b* to move toward the cylinder bottom side and is separated from the valve seat 444*b*. Thus, the second chamber 4B is brought into communication with the first chamber 4A through the through passage 444*a* of the valve seat 444. Since the first chamber 4A has been supplied with the high-pressure brake fluid from the accumulator 431, the communication causes the fluid pressure in the second chamber 4B to rise. As a result of the second chamber 4B increasing in fluid pressure, the force acting on the control piston 445 in the second chamber 4B becomes larger than the force acting on the control piston 445 as the pilot pressure, and thus, the control piston 455 is slidden toward the cylinder opening side to block the second chamber 4B from the first chamber 4A. By the operation like this, the fluid pressure in the second chamber 4B becomes the fluid pressure corresponding to the pilot pressure. It is to be noted that the brake ECU 6 controls the reducing valve 41 and the pressure increase valve 42 to heighten the pilot pressure in the pressure control chamber 4D as the target friction brake force increases. That is, as the target friction brake force increases, the pilot pressure is raised, so that the servo pressure is also raised.

With a pressure increase in the second chamber 4B, the servo chamber 1A communicating therewith increases in pressure. The pressure increase in the servo chamber 1A causes the first master piston 14 to advance to increase the pressure in the first master chamber 1D. Thus, the second master piston 15 also advances to increase the pressure in the second master chamber 1E. With the pressure increase in the first and second master chambers 1D, 1E, a high-pressure brake fluid is supplied from the first master chamber 1D to the ABS 53 and the fourth chamber 4E and from the second master chamber 1E to the ABS 53. Although the pressure in the fourth chamber 4E increases, the pressure in the pressure control chamber 4D has been increased likewise, and hence, the sub piston 46 does not move. In this manner, the ABS 53 is supplied with the brake fluid of the high pressure (master cylinder pressure), whereby the friction brakes are operated to brake the vehicle. In the liner mode, the force that advances the first master piston 14 corresponds to the force depending on the servo pressure.

When the braking operation is released, on the contrary, the brake ECU 6 brings the reducing valve 41 into the open state and the pressure increase valve 42 into the closed state to make the pressure control chamber 4D communicate with the reservoir 171. Thus, the control piston 445 is retracted to the state where it stands before the stepping of the brake pedal 10.

(REG Mode)

In the REG mode, the reducing valve 41, the pressure increase valve 42, the separation locking valve 22 and the reaction force valve 3 are not electrified (i.e., not controlled), which holds the reducing valve 41 in the open state, the pressure increase valve 42 in the closed state, the separation locking valve 22 in the closed state and the reaction force valve 3 in the open state. Further, even after the brake pedal 10 is stepped on, such non-electrifying state (non-control state) is maintained.

In the REG mode, when the brake pedal 10 is stepped on, the input piston 13 advances and blocks the passage 18 to isolate the separation chamber 1B from the reservoir 171. In this state, because of the separation locking valve 22 being held in the closed state, the separation chamber 1B becomes a hermetic state (fluid-tight). However, because the reaction force valve 3 is in the open state, the reaction force pressure chamber 1C is in communication with the reservoir 171.

When the brake pedal 10 is stepped on further in this state, the advance of the input piston 13 causes the separation chamber 1B to rise in pressure, and the first master piston 14 is advanced by the rise in pressure. At this time, the reducing valve 41 and the pressure increase valve 42 are not electrified, so that the servo pressure is not being controlled. That is, the first master piston 14 is advanced by the force only that corresponds to the operation force on the brake pedal 10 (i.e., by the pressure in the separation chamber 1B). Thus, the servo chamber 1A increases in volume and is thus replenished with brake fluid because of being in communication with the reservoir 171 by way of the regulator 44.

When the first master piston 14 is advanced, the first master chamber 1D and the second master chamber 1E are increased in pressure in the same manner as done in the linear mode. The pressure increase in the first master chamber 1D causes the fourth chamber 4E to be also increased in pressure, whereby the sub piston 446 is slidden toward the cylinder bottom side. At the same time, the control piston 445 is pushed by the first protrusion 446b to move toward the cylinder bottom side. Thus, the protrusion 445b comes into contact with the ball valve 442, and the ball valve 442 is pushed to move the cylinder bottom side. As a result, the first chamber 4A is brought into communication with the second chamber 4B, and the servo chamber 1A is blocked from the reservoir 171, whereby the high-pressure brake fluid from the accumulator 431 is supplied to the servo chamber 1A.

As described above, in the REG mode, when the brake pedal 10 is operated through a predetermined stroke or more, the servo chamber 1A is brought into communication with the accumulator 431, so that the servo pressure is increased without the control by the brake ECU 6. Thus, the first master piston 14 is advanced beyond the distance through which it is advanced by the operation force given by the driver. Accordingly, the high-pressure brake fluid is supplied to the ABS 53 even in the state that the respective electromagnetic valves remain in the non-electrified state.

In the REG mode, the force that advances the first master piston 14 is equivalent to the force corresponding to the operation force. That is, the force corresponding to the operation force means the sum of the force that advances the first master piston 14 by the operation force only, and the force that advances the first master piston 14 by the servo pressure which is mechanically generated by the driving of the first master piston 14.

Input-Piston Contact Inferring Processing in First Embodiment

Hereafter, with reference to the flow chart shown in FIG. 3, description will be made regarding an input-piston contact inferring processing in the first embodiment. When a state is made in which the vehicle is able to travel and the brake ECU 6 is started, the brake ECU 6 at step S11 acquires a moving amount Di of the input piston 13 from the stroke sensor 72 and a reaction force pressure Pa in the separation chamber 1B and the reaction force chamber 1C from the pressure sensor 73 and then, advances the program to step S12.

At step S12, the brake ECU 6 calculates a demand brake force by applying the moving amount Di and the reaction force pressure Pa so acquired to a data map (not shown) representing the correlation of demand brake force to moving amount Di and reaction force pressures Pa. Then, the brake ECU 6 outputs the calculated demand brake force to the hybrid ECU (not shown), then acquires from the hybrid ECU a target value, that is, a target regenerative brake force for the regenerative brake device (not shown), then calculates a target friction brake force by subtracting the target regenerative brake force from the demand brake force, and thereafter, advances the program to step S13.

At step S13, the brake ECU 6 calculates from the target friction brake force a demand wheel cylinder pressure Ph which is to be applied to the wheel cylinders WCfl, WCfr, WCrl, WCrr, and then, advances the program to step S14.

Figure 4B:
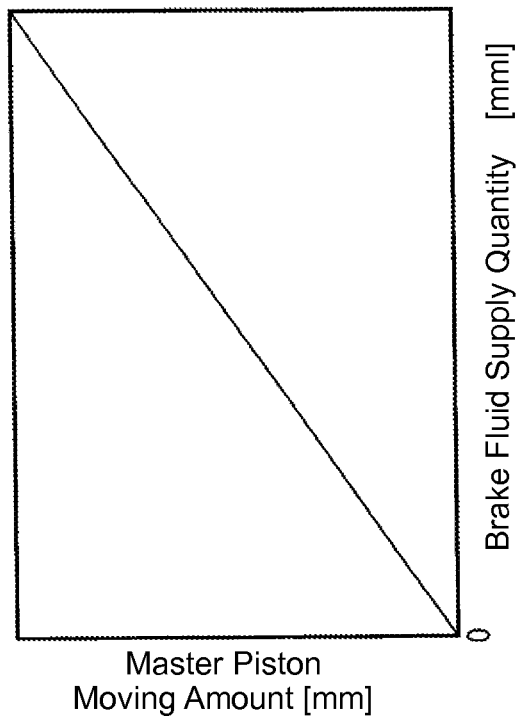
FIG. 4(B) is a data map representing the relation between brake fluid supply quantity and master piston moving amount.
Figure 4A:
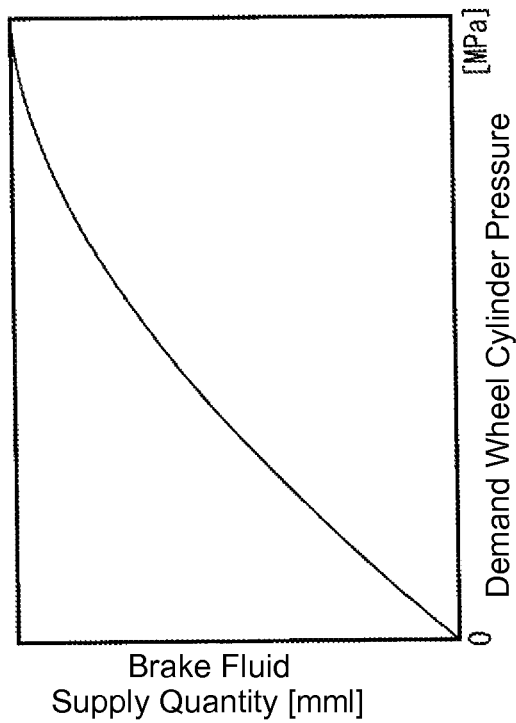
FIG. 4(A) is a data map representing the relation between demand wheel cylinder pressure and brake fluid supply quantity.

At step S14, the brake ECU 6 calculates a brake fluid supply quantity Fq by applying the demand wheel cylinder pressure Ph to another data map shown in FIG. 4(A) representing the correlation of demand wheel cylinder pressure to brake fluid supply quantity. As shown in FIG. 4(A), the brake fluid supply quantity increases as the demand wheel cylinder pressure increases. The program proceeds to step S15 upon completion of step S14.

At step S15, the brake ECU 6 calculates a moving amount Dm of the first master piston 14 by applying the brake fluid supply quantity Fq to another data map shown in FIG. 4(B) representing the correlation of brake fluid feed quantity to moving amount of the first master piston 14. As shown in FIG. 4(B), the moving amount of the first master piston 14 also increases in proportion to the increase in the brake fluid supply quantity. The program proceeds to step S16 upon completion of step S15.

At step S16, the brake ECU 6 calculates the separation distance Ds between the input piston 13 and the first master piston 14 from the moving amount Di of the input piston 13 and the moving amount Dm of the first master piston 14 which has been calculated as above. Specifically, the separation distance Ds between the input piston 13 and the first master piston 14 is calculated by substituting the detected moving amount Di of the input piston 13 and the calculated moving amount Dm of the first master piston 14 into the following expression (1).

$$Ds = Dp - Di + Dm \quad (1)$$

Ds: Separation distance of the first master piston 14 from the input piston 13 (mm)
Dp: Initial separation distance of the first master piston 14 from the input piston (mm)
Di: Moving amount of the input piston (mm)
Dm: Moving amount of the first master piston (mm)

The initial separation distance Dp is the separation distance of the first master piston 14 from the input piston 13 in the state of the brake pedal 10 being not stepped on.

The program proceeds to step S17 upon completion of step S16.

At step S17, the brake ECU 6 infers whether or not the first master piston 14 is in contact with the input piston 13, based on the separation distance Ds of the first master piston 14 from the input piston 13. At the time of an initial inference, the brake ECU 6 infers that they are in the separation state. At the time of the next inference or each subsequent inference, the inference is made based on a separation-time threshold valve or a contact-time threshold value that differs in dependence on whether the last inference result is the separation state or the contact state. That is, when the last inference result indicates the separation state, the brake ECU 6 infers that the separation state is kept if the separation distance Ds is larger than the separation-time threshold valve (e.g., 0 mm) but infers that the contact state exists if the separation distance Ds is equal to or less than the separation-time threshold valve (e.g., 0 mm). On the other hand, when the last inference result indicates the contact state, the brake ECU 6 infers that the contact state is kept if the separation distance Ds is smaller than the contact-time threshold value (e.g., 2 mm), but infers that the separation state exists if the separation distance Ds is equal to or longer than the contact-time threshold value (e.g., 2 mm).

The program proceeds to step S11 upon completion of step S16.

Input-Piston Contact Inferring Processing in Second Embodiment

Figure 5:
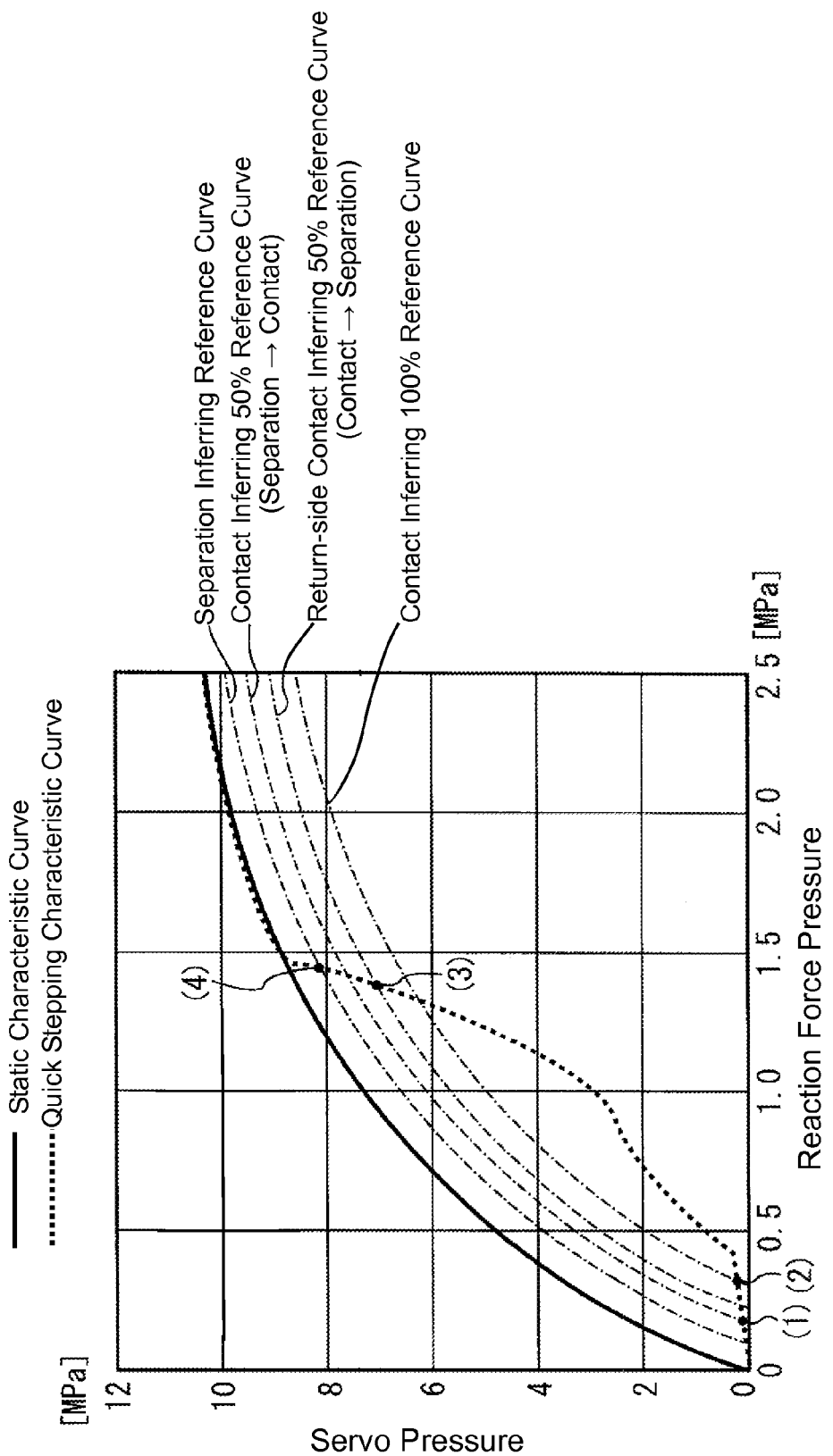
FIG. 5 is a graph representing a data map that is used to infer the contact of the input piston with a master piston in a second inferring processing for the contact of the input piston.

Hereafter, with reference to a graph shown in FIG. 5, description will be made regarding an input-piston contact inferring processing in a second embodiment. First of all, the graph in FIG. 5 will be described. The graph in FIG. 5 is a graph that represents the relation between the reaction force pressure Pa detected by the pressure sensor 73 and the servo pressure Ps detected by the pressure sensor 74, and as described later, is used in the form of a data map representing those various curves similar to a static characteristic curve. In the graph, there are set a separation inferring reference curve, a contact inferring 50% reference curve, a return-side contact inferring 50% reference curve and a contact inferring 100% reference curve. The abscissa indicates the reaction fore pressure, and the ordinate indicates the servo pressure.

The solid line in FIG. 5 represents the static characteristic curve. The static characteristic curve is a characteristic curve that represents the relation between the reaction force pressure Pa and the servo pressure Ps when the driver slowly steps on the brake pedal 10. The static characteristic curve represents the servo pressure Ps increasing as the reaction force pressure Pa increases. At an early stage of the increase in the reaction force pressure Pa, the servo pressure Pa increases greatly with an increase of the reaction force pressure Pa, while in the state that the reaction force pressure Pa has increased to a certain degree, the servo pressure Ps increases gently with the increase of the reaction force pressure Pa in comparison with its increase at the early stage of the increase in the reaction force pressure Pa. When the driver slowly steps on the brake pedal 10, the servo pressure Ps at the early stage of the increase in the reaction force pressure Pa increases to follow the increase of the reaction force pressure Pa, as shown by the static characteristic curve in FIG. 5.

The dotted line in FIG. 5 represents a quick stepping characteristic curve. The quick stepping characteristic curve is a characteristic curve that represents the relation between the reaction force pressure Pa and the servo pressure Ps when the driver quickly steps on the brake pedal 10 for a quick braking or the like (hereafter referred as "quick stepping"). In the case of the quick stepping, the input piston 13 is quickly advanced, and a quick pressure increase occurs in the separation chamber 1B and the reaction force chamber 1C, so that the reaction force pressure Pa rises quickly.

On the contrary, the servo pressure in the case of the quick stepping does not follow the rise of the reaction force pressure Pa. The reason for this will be described hereinafter. The brake ECU 6 controls the reducing valve 41 and the pressure increase valve 42 based on the moving amount of the input piston 13 detected by the stroke sensor 72, to generates a pilot pressure and then, generates a servo pressure depending on the generated pilot pressure. That is, for the generation of the servo pressure, the reducing valve 41 is controlled in the direction to be closed and the pressure increase valve 42 is controlled in the direction to be opened to generate the pilot pressure, and the control piston 445 is moved by the generated pilot pressure, whereby the high-pressure brake fluid from the accumulator 431 is supplied to generate the servo pressure. At this time, delays in response occur in the reducing valve 41 and the pressure increase valve 42 as well as in the movement of the control piston 445 due to a sliding resistance or the like caused by the seal members, and such delays result in a delay in response for the generation of the servo pressure. Thus, at the early stage of the increase in the reaction force pressure Pa, the servo pressure Ps does not follow the increase of the reaction force pressure Pa. Thereafter, when the control piston 445 is moved to generate the servo pressure Ps, the same rises quickly. After rising to the certain degree, the servo pressure Pa increases like the static characteristic curve even at the time of the quick stepping.

The increase of the reaction force pressure Pa means the movement of the input piston 13, and the increase of the servo pressure Ps means the movement of the master piston 14. When the servo pressure Ps follows the increase of the reaction force pressure Pa, the first master piston 14 moves to follow the movement of the input piston 13. When the servo pressure Ps does not follow the increase of the reaction force pressure Pa, on the contrary, the first master piston 14 does not move to follow the movement of the input piston 13, so that the input piston 13 comes close to the first master piston 14.

Based on the aforementioned findings, as indicated by respective one-dot-chain curves in FIG. 5, the inventors of the present invention have properly set, on the side higher in the reaction force pressure, the separation inferring reference curve, the contact inferring 50% reference curve, the return-side contact inferring 50% reference curve and the contact inferring 100% reference curve which are all analogous to the static characteristic curve, in order of the lower side to the higher side in the reaction force pressure and have determined to infer the separation/contact between the first master piston 14 and the input piston 13 based on these reference curves. That is, by detecting that the relation between the reaction force pressure Pa and the servo pressure Ps moves away from the static characteristic curve in the direction in which the reaction force pressure increases, it becomes possible to detect the state that the increase of the serve pressure Ps is not following the increase of the reaction force pressure Pa, and hence, it becomes possible to infer that the input piston 13 has come close to the first master piston 14 or has contacted the same.

The contact inferring 50% reference curve is a reference value for inferring that the input piston 13 and the first master piston 14 in the separation state have turned to the contact state with a probability of 50%. When judging that like the case of (1) in FIG. 5, the relation between the reaction force pressure Pa and the servo pressure Ps has shifted from the left side of the contact inferring 50% reference curve to the right side (toward the side on which the reaction force pressure increases), the brake EUC 6 infers that the input piston 13 and the first master piston 14 in the separation state have turned to the contact state with the probability of 50%.

The contact inferring 100% reference curve is a reference value for inferring whether or not the input piston 13 is in the contact state with the first master piston 14 with a probability of 100%. When judging that like the case of (2) in FIG. 5, the relation between the reaction force pressure Pa and the servo pressure Ps has shifted from the left side of the contact inferring 100% reference curve to the right side (toward the increase side of the reaction force pressure), the brake EUC 6 infers that the input piston 13 is in the contact state with the first master piston 14 with the probability of 100%.

The return-side contact inferring 50% reference curve is a reference value for inferring whether or not the input piston 13 and the first master piston 14 inferred to be in the contact state with the probability of 100% have turned to the contact state with the probability of 50%. When judging that like the case of (3) in FIG. 5, the relation between the reaction force pressure Pa and the servo pressure Ps has shifted from the right side of the contact inferring 50% reference curve to the left side (toward the decrease side of the reaction force pressure), the brake EUC 6 infers that the input piston 13 and the first master piston 14 inferred to be in the contact state with the probability of 100% have turned to the contact state with the probability of 50%.

The separation inferring reference curve is a reference value for inferring whether or not the input piston 13 and the first master piston 14 are in the separation state. When judging that like the case of (4) in FIG. 5, the relation between the reaction force pressure Pa and the servo pressure Ps has shifted from the right side of the contact inferring 50% reference curve to the left side (toward the decrease side of the reaction force pressure), the brake EUC 6 infers that the input piston 13 and the first master piston 14 inferred to be in the contact state with the probability of 50% have turned to the separation state.

Effects of Present Embodiments

As clear from the foregoing description, as a result of repetitive experiments on the friction brake device B (vehicle brake device), the inventors of the present invention acquired the findings that the moving amount of the first master piston 14 can be calculated based on the moving amount of the input piston 13. That is, the servo pressure is generated based on the moving amount of the input piston 13 and acts in the servo chamber 1A to move the master pistons 14, 15, so that brake fluids are supplied from the master chambers 1D, 1E to the wheel cylinders WCrl, WCrr, WCfl, WCfr. Therefore, it is possible to calculate, based on the moving amount of the input piston 13, the supply quantities of the brake fluids from the master chambers 1D, 1E to the wheel cylinders WCrl, WCrr, WCfl, WCfr. Then, it is possible to calculate the moving amount of the first master piston 14 from the supply quantities of the brake fluids to the wheel cylinders WCrl, WCrr, WCfl, WCfr.

Figure 3:
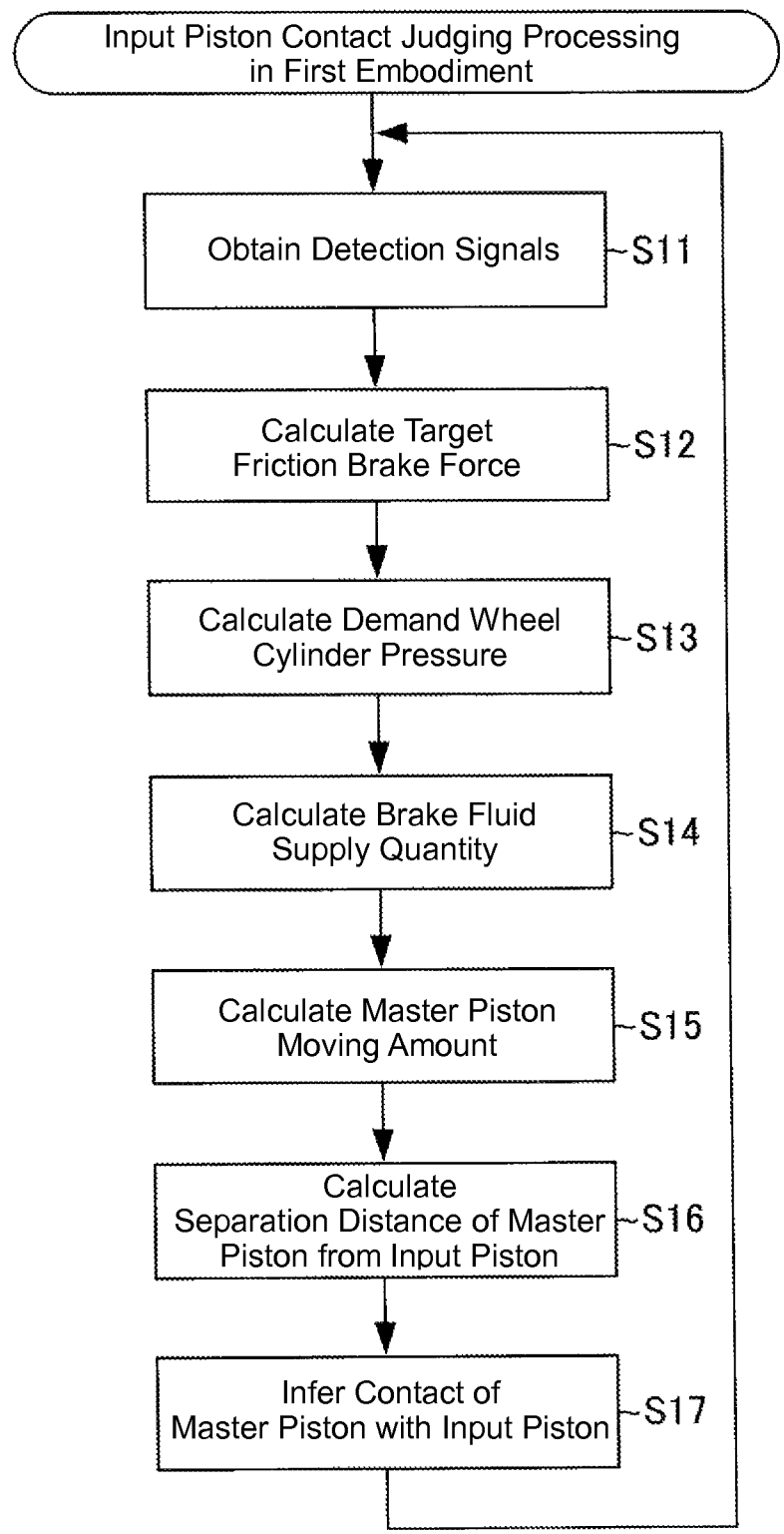
FIG. 3 is a flow chart showing a first inferring processing for the contact of an input piston, the processing being a control program executed by a brake ECU shown in FIG. 1.

As shown as the foregoing processing at steps S11 through S15 in FIG. 3, the brake ECU 6 (acting at step S15 as master piston moving amount calculating section) can calculate the moving amount of the first master piston 14 based on the moving amount of the input piston 13, and the brake ECU 6 (acting at steps S16 and S17 as contact inferring section) can infer the contact of the first master piston (protruding portion 42) with the input piston 13 based on the moving amount of the first master piston 14 and the moving amount of the input piston 13. Consequently, it can be realized to infer the contact of the input piston 13 with the first master piston 14 without providing any additional sensor.

Further, as a result of the repetitive experiments on the friction brake device B (vehicle brake device), the inventors of the present invention acquired the findings that when the driver steps on the brake pedal 10 quickly, the servo pressure do not follow the increase of the reaction force pressure, as shown in FIG. 5. The reaction force pressure in the separation chamber 1B to which the input piston 13 is exposed rises quickly with the quick movement of the input piston 13, whereas the servo pressure generating device 4 (servo pressure generating section) that generates the servo pressure upon the detection of the movement of the input piston 13 has a response delay in increasing the servo pressure, and hence, the servo pressure does not follow the increase of the reaction force pressure. The increase in the reaction force pressure means the movement of the input piston 13, and the increase in the servo pressure means the movement of the master piston 14. When the servo pressure does not follow the increase in the reaction force pressure, the first master piston 14 does not move in the manner to follow the movement of the input piston 13, so that the input piston 13 comes close to the first master piston 14.

Therefore, as described above with reference to FIG. 5, the brake EUC 6 (acting as contact inferring section) can infer the input piston 13 coming close to the first master piston 14 and hence, the contact therebetween based on the reaction force pressure and the servo pressure. Consequently, it can be realized to infer the contact of the input piston 13 with the first master piston 14 without providing any additional sensor.

Further, the contact-time threshold value (separation of 2 mm in the present embodiment) being a distance reference based on which the brake ECU 6 (acting at step S16 and S17 as contact inferring section) infers that the input piston 13 and the first master piston 14 inferred to be in the contact state have turned to the separation state is set to be larger than the separation-time threshold value (0 mm in the present embodiment) being another distance reference based on which the brake ECU 6 infers that the input piston 13 and the first master piston 14 inferred to be in the separation state have turned to the contact state. This advantageously prevents the contact and the separation between the input piston 13 and the first master piston 14 from being inferred frequently and repetitively (i.e., from falling in a chattering phenomenon) after the contact of the input piston 13 with the first master piston 14.

Further, as shown in FIG. 5, the reference (the separation inferring reference curve shown in FIG. 5) based on which the brake ECU 6 (acting as contact inferring section) infers that the input piston 13 and the first master piston 14 inferred to be in the contact state have turned to the separation state is set on the side to decrease the reaction force pressure in comparison with the reference (the contact inferring 100% reference curve shown in FIG. 5) based on which the brake ECU 6 infers that the input piston 13 and the first master piston 14 inferred to be in the separation state have turned to the contact state. This also advantageously prevents the contact and the separation between the input piston 13 and the first master piston 14 from being inferred frequently and repetitively (i.e., from falling in a chattering phenomenon) after the contact of the input piston 13 with the first master piston 14.

In the foregoing embodiment, at step S12 in FIG. 3, the brake ECU 6 calculates a demand brake force based on the moving amount Di of the input piston 13 and the reaction force pressure Pa and then, calculates a target friction brake force. However, a modification can be made wherein the brake ECU 6 calculates a demand brake force based only on the moving amount Di of the input piston 13 and then, calculates a target friction brake force.

Further, in the foregoing embodiment, at steps S13 to S15 in FIG. 3, the brake ECU 6 calculates a demand wheel cylinder pressure Ph from a target friction brake force, then calculates a brake fluid supply quantity Fq from the demand wheel cylinder pressure Ph and further calculates a moving amount Dm of the first master piston 14 from the brake fluid supply quantity Fq. However, a modification can be made for the brake ECU 6 to directly calculate the moving amount Dm of the first master piston 14 by applying the target friction brake force to a data map representing the relation between friction brake force and moving amount Dm of the first master piston 14. An alternative modification can be made for the brake ECU 6 to calculate the demand wheel cylinder pressure Ph from the target friction brake force and then to calculate the moving amount Dm of the first master piston 14 by applying the demand wheel cylinder pressure Ph to a data map representing the relation between demand wheel cylinder pressure Ph and moving amount Dm of the first master piston 14.

Further, in the foregoing embodiment, the brake ECU 6 judges that where the last inferred result at step S17 in FIG. 3 indicates the separation state, the input piston 13 is in contact with the first master piston 14 if the separation distance Ds between the first master piston 14 and the input piston 13 changes to 0 mm or less. However, a modification can be made wherein the brake ECU 6 judges that the input piston 13 is in contact with the first master piston 14 if the separation distance Ds between the first master piston 14 and the input piston 13 changes to a predetermined distance (e.g., 0.1 mm) or less. Further, although in the foregoing embodiment, the brake ECU 6 judges that where the last inferred result indicates the contact state, the input piston 13 is in the separation state from the first master piston 14 (protruding portion 142) if the separation distance Ds is 2 mm or more, a modification can be made wherein the brake ECU 6 judges that the input piston 13 is in the separation state from the first master piston 14 (protruding portion 142) if the separation distance Ds becomes larger than 0 mm or becomes a predetermined distance (e.g., 0.5 mm) or more.

(Inference of Master Pressure)

When in the linear mode, the front end surface of the input piston 13 in the master cylinder 1 contacts the rear end surface of the protruding portion 142 of the first master piston 14, the force that pushes the first master piston 14 from the separation chamber 1B side decreases by a force that depends on the pressure acting on the contact area, and instead, increases by a force that exerted from the input piston 13, that is, a force that depends on the stepping force on the brake pedal 10. Thus, it may be the case that the actual master pressure in the first master chamber 1D (the second master chamber 1E) varies by the difference between the foregoing decrement and increment and hence, deviates from the target master pressure, thereby degrading the accuracy in the brake control of the ABS (antilock brake device) which is performed based on the master pressure.

Figure 6:
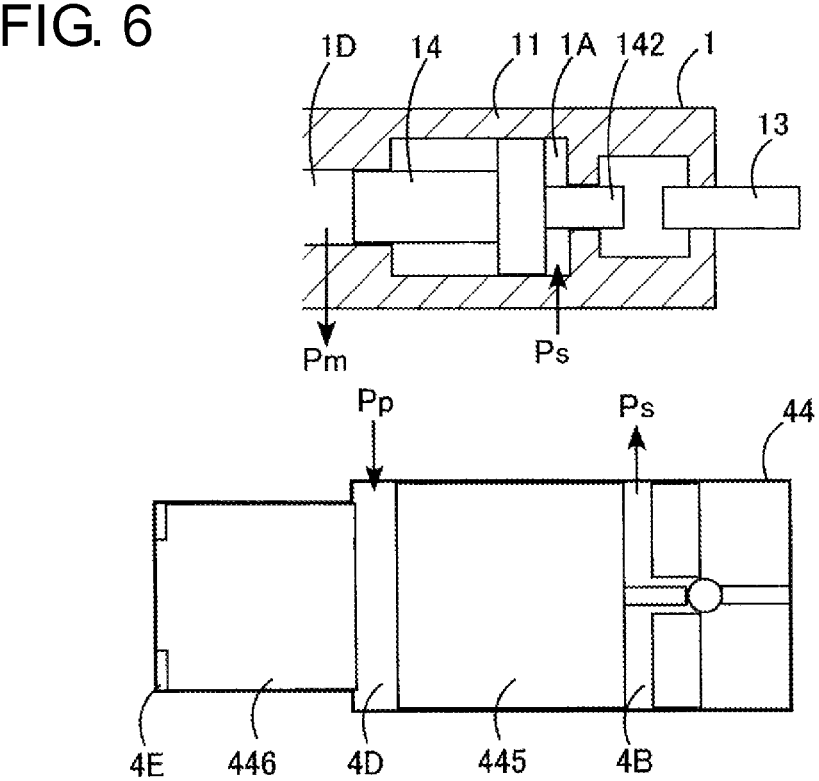
FIG. 6 is a sectional view indicating pressures at various parts in a master cylinder and the regulator in the state that the input piston is held separated from the master piston.

Therefore, the inference of an accurate master pressure will be described with reference to FIG. 6. When as shown in FIG. 6, the front end surface of the input piston 13 in the master cylinder 1 is in the separation state from the rear end surface of the protruding portion 142 of the first master piston 14, the master pressure Pm in the first master chamber 1D is controlled by the servo pressure Ps in the servo chamber 1A. That is, the master pressure Pm becomes a value that is obtained by multiplying the servo pressure Ps with the section area of the servo chamber 1A and dividing the product by the section area of a pressured portion of the first master piston 14. In the present embodiment, the section area of the pressured portion of the first master piston 14 is formed to be equal to the section area of the servo chamber 1A, and hence, the master pressure Pm becomes equal to the servo pressure Ps.

Further, the servo pressure Ps in the servo chamber 1A is the servo pressure Ps that is generated in the second chamber 4B (servo pressure generating chamber) in the regulator 44 and is generated by the pilot pressure Pp in the pressure control chamber 4D (first pilot chamber). Thus, when the pilot pressure Pp in the pressure control chamber 4D rises, the control piston 445 is slidden toward the cylinder bottom side (toward the right in the figure) to raise the servo pressure Ps in the second chamber 4B. Then, with the pressure rise in the second chamber 4B, the servo pressure Ps in the servo chamber 1A also rises. Although the fourth chamber 4E (second pilot chamber) rises in pressure, the sub piston 446 does not slide because the pressure control chamber 4D also rises in pressure.

At this time, the balance between pressures in the regulator 44 is expressed by the following expression (1) where the section areas of the second chamber 4B and the pressure control chamber 4D are defined as S1 and S2 respectively.

$$Ps = Pp \cdot S2/S1 \quad (1)$$

Since the master pressure Pm is equal to the servo pressure Ps as mentioned earlier, an inferred master pressure can be expressed by the following expression (2).

$$Pm = Ps = Pp \cdot S2/S1 \quad (2)$$

Therefore, it is possible to make an inference calculation for the master pressure Pm based on the pilot pressure Pp being a command value in the brake ECU 6 and a first servo ratio S2/S1 being a section area ratio of the section area S2 of the pressure control chamber 4D to the section area S1 of the second chamber 4B. The first servo ratio S2/S1 is stored in the brake ECU 6 through a prior calculation. In the present embodiment, since the section area S1 of the second chamber 4B and the section area S2 of the pressure control chamber 4D are set to be equal, the first servo ratio S2/S1 becomes 1. In a modified form, the master pressure Pm can be inferred by detecting the servo pressure Ps by the pressure sensor 74.

Figure 7:
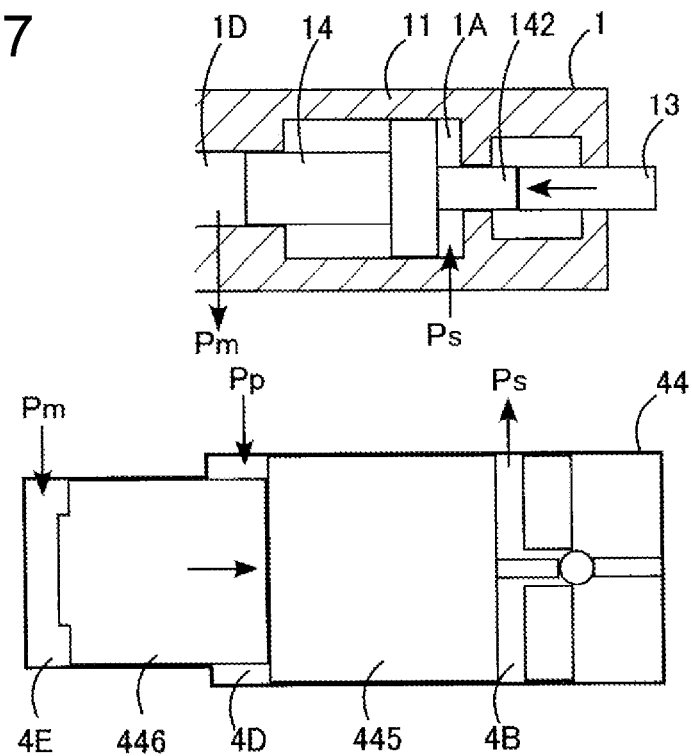
FIG. 7 is a sectional view indicating pressures at the various parts in the master cylinder and the regulator in the state that the input piston is held in contact with the master piston.

Next, when as shown in FIG. 7, the front end surface of the input piston 13 in the master cylinder 1 is in the contact state with the rear end surface of the protruding portion 142 of the first master piston 14, the master pressure Pm in the first master chamber 1D is controlled by the servo pressure Ps in the servo chamber 1A and the stepping force on the brake pedal 10. The servo pressure Ps in the servo chamber 1A is the servo pressure Ps generated in the second chamber 4B of the regulator 44 and is generated by the pressure (master pressure Pm) in the fourth chamber 4E and the pilot pressure Pp in the pressure control chamber 4D. That is, with the rise of the master pressure Pm in the master chamber 1D, the fourth chamber 4E rises in pressure. The pressure in the fourth chamber 4E becomes larger by a part corresponding to the stepping force on the brake pedal 10 than the pilot pressure Pp in the pressure control chamber 4D. Thus, with the pressure rise in the fourth chamber 4E, the sub piston 446 is slidden toward the cylinder bottom side (toward the right in the figure) to come into contact with the control piston 445 and hence, is slidden together with the control piston 445 toward the cylinder bottom side (toward the right in the figure). As a result, the second pressure 4B rises in pressure to raise the servo pressure Ps in the servo chamber 1A.

At this time, the balance between pressures in the regulator 44 is expressed by the following expression (3) where the section area of the fourth chamber 4E is defined as S3.

The section area S3 of the fourth chamber 4E is set to be smaller than the section area S1 of the second chamber 4B.

$$Pm \cdot S3 + Pp(S1-S3) = Ps \cdot S1 \quad (3)$$

From the expression (3), an inferred master pressure Pm can be expressed by the following expression (4).

$$Pm = Ps \cdot S1/S3 - Pp(S1-S3)/S3 \quad (4)$$

Therefore, it is possible to make an inference calculation for the master pressure Pm based on the servo pressure Ps, the pilot pressure Pp and a second servo ratio S3/S1 being the section ratio of the fourth chamber 4E to the second chamber 4B. The second servo ratio S3/S1 is stored in the brake ECU 6 through a prior calculation.

(First Inferring Processing for Master Pressure)

Figure 8:
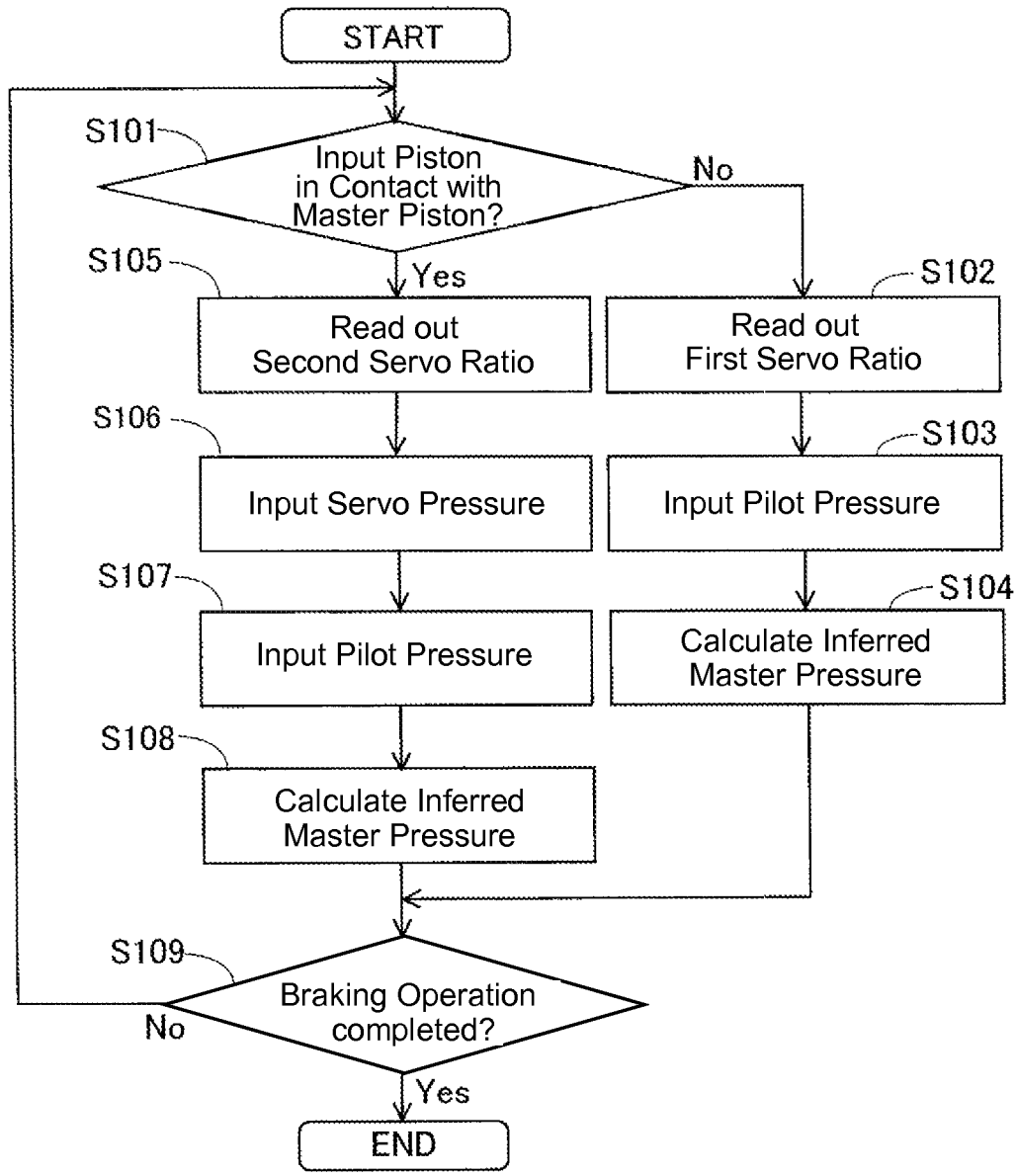
FIG. 8 is a flow chart showing a master pressure inferring processing being a control program executed by the brake ECU shown in FIG. 1.

Next, with reference to FIG. 8, description will be made regarding control operations that infer the master pressure when the front end surface of the input piston 13 in the master cylinder 1 is in the contact state with, or the separation state from, the rear end surface of the protruding portion 142 of the first master piston 14. As shown in FIG. 8, a judgment is made of whether or not the front end surface of the input piston 13 is in contact with the rear end surface of the protruding portion 142 of the first master piston 14 (step S101). When the front end surface of the input piston 13 is not in contact with the rear end surface of the protruding portion 142 of the first master piston 14, the first servo ratio S2/S1 is read out (step S102), and a command value of the pilot pressure Pp is inputted (step S103). Then, the inference calculation for the master pressure Pm is made by the expression (2) based on the pilot pressure Pp and the first servo ratio S2/S1 (step S104).

When at step S101, the front end surface of the input piston 13 is judged to be in contact with the rear end surface of the protruding portion 142 of the first master piston 14, the second servo ratio S3/S1 is read out (step S105), the servo pressure Ps is inputted from the pressure sensor 74 (step S106), and a command value of the pilot pressure Pp is inputted (step S107). Then, the inference calculation for the master pressure Pm is made by the expression (4) based on the servo pressure Ps, the pilot pressure Pp and the second servo ratio S3/S1 (step S108).

Thereafter, it is judged whether or not the braking operation has be completed (step S109). When the braking operation has not been completed, return is made to step S101 to repeat the foregoing processing. When the braking operation has been completed, all of the processing are terminated.

The control shown in FIG. 8 shows the example wherein the first servo ratio and the second servo ratio are immediately switched after the front end surface of the input piston 13 of the master cylinder 1 is inferred as to whether in the contact state with, or the separation state from, the rear end surface of the protruding portion 142 of the first master cylinder 14. In a modified form, as described hereinafter, a third servo ratio being between the first and second servo ratios can be calculated in dependence on the degree of contact (i.e., the separation inferring reference curve, the contact inferring 50% reference curve, the return-side contact inferring 50% reference curve and the contact inferring 100% reference curve) having been described earlier in "Input-Piston Contact Inferring Processing in Second Embodiment", and the master pressure Pm can be calculated based on the third servo ratio, the servo pressure Ps and the pilot pressure Pp.

(Second Inferring Processing for Master Pressure)

Figure 9:
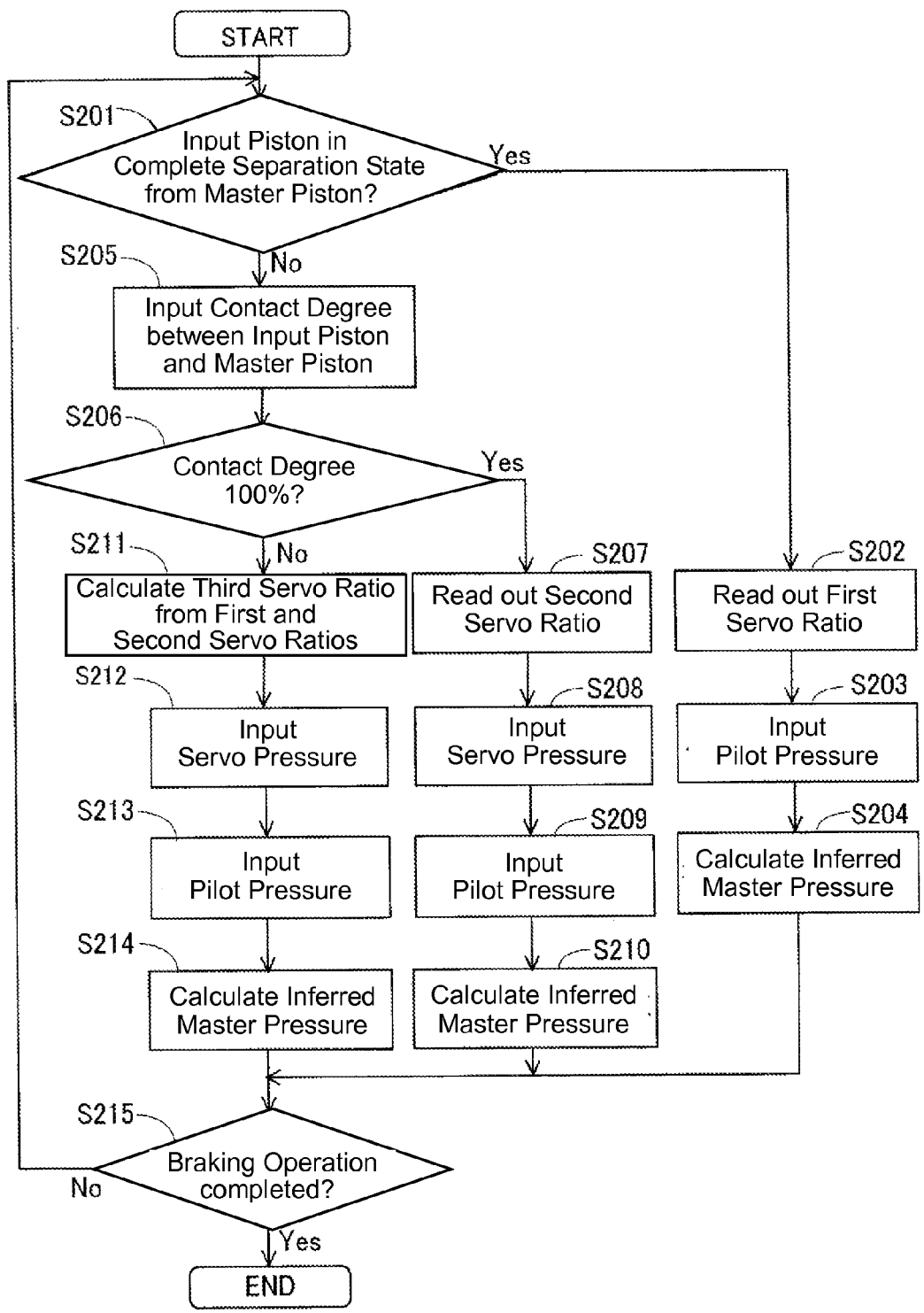
FIG. 9 is a flow chart showing another master pressure inferring processing being a control program executed by the brake ECU shown in FIG. 1.

This control processing will be described with reference to FIG. 9. As shown in FIG. 9, a judgment is made of whether or not the front end surface of the input piston 13 is in the complete separation state from the rear end surface of the protruding portion 142 of the first master piston 14 (step S201). When the front end surface of the input piston 13 is in the complete separation state from the rear end surface of the protruding portion 142 of the first master piston 14, the first servo ratio S2/S1 is read out (step S202), and a command value of the pilot pressure Pp is inputted (step S203). Then, the inference calculation for the master pressure Pm is made by the expression (2) based on the pilot pressure Pp and the first servo ratio S2/S1 (step S204).

Where at step S201, the front end surface of the input piston 13 is judged not to be in the complete separation state from the rear end surface of the protruding portion 142 of the first master piston 14, the degree of contact is inputted (step S205). Then, it is judged whether or not the degree of contact is 100% (step S206), and when the degree of contact is 100%, the second servo ratio S3/S1 is read out (step S207), the servo pressure Ps is inputted from the pressure sensor 74 (step S207), and a command value of the pilot pressure Pp is inputted (step S209). Then, the inference calculation for the master pressure Pm is made by the expression (4) based on the servo pressure Ps, the pilot pressure Pp and the second servo ratio S3/S1 (step S210).

When the degree of contact is judged not to be 100% at step S206, on the other hand, the third servo ratio being between the first and second servo ratios is calculated in dependence on the degree of contact (step S211). Then, the servo pressure Ps is inputted from the pressure sensor 74 (step S212), and a command value of the pilot pressure Pp is inputted (step S213). Then, the inference calculation for the master pressure Pm is made by the expression (4) the second servo ratio of which is replaced by the third servo ratio, based on the servo pressure Ps, the pilot pressure Pp and the third servo ratio (step S214).

As understood from the above, the first to third servo ratios are selectively used in calculating an inferred master pressure that is to be accurate for precise control of the ABS 53, in dependence on the contact/separation state of the input piston 13 with respect to the protruding portion 142 of the first master piston 14. In this viewpoint, the first to third servo ratios are regarded respectively as first to third factors which are key factors to determine respective inferred master pressures in dependence on the separation or the contact degree of the input piston 13 with the first master piston 14.

Thereafter, it is judged whether or not the braking operation has been completed (step S215). When the braking operation has not been completed, return is made to step S201 to repeat the foregoing processing. When the braking operation has been completed, all of the processing are terminated.

As described hereinabove, the brake ECU 6 (acting as master pressure inferring section) makes the inference based on the pilot pressure Pp and the first servo ratio S2/S1 when the master piston 14 and the input piston 13 are in the separation state. When the master piston 14 and the input piston 13 are in the separation state, the master pressure Pm is controlled by the servo pressure Ps which is generated by the pilot pressure Pp, and hence, it is possible to infer an accurate master pressure Pm. When the master piston 14 and the input piston 13 are in the contact state, on the other hand, the master pressure Pm is inferred based on the servo pressure Ps, the pilot pressure Pp and the second servo ratio S3/S1. When the master piston 14 and the input piston 13 are in the contact state, the stepping force of the brake pedal 10 is added to the master pressure Pm, and therefore, the accurate the master pressure Pm can be inferred with consideration taken into the pilot pressure Pm depending on the moving amount of the input piston 13. Accordingly, the performance in the braking control such as the ABS (antilock brake system) or the like can be enhanced. Further, a cost reduction can be realized because any detection sensor for the master pressure Pm becomes unnecessary.

Further, because the reaction force generating unit 2 generates a reaction force depending on the moving amount of the input piston 13, the pilot pressure Pp can be obtained by measuring the reaction force. Further, since the reaction force pressure chamber 1C is formed between the large-diameter bore portion of the main cylinder 11 and the external surface of the master piston 14 so as not to influence the master chamber 1D, degradation in accuracy does not arise in the inference of the master pressure Pm.

The regulator 44 in the present embodiment is provided at least with the first chamber 4A defined in the cylinder 441 and communicating with the accumulator 431 (accumulating section), the second chamber 4B defined in the cylinder 441 and communicating with the servo chamber 1A, the pressure control chamber 4D defined in the cylinder 441 and communicating with the pressure increase valve 42 and the reducing valve 41, and the fourth chamber 4E (pressure receiving chamber) defined in the cylinder 441 and communicating with the first master chamber 1D. Further, the regulator 44 suffices to be provided with the piston 445 or the pistons 445 and 446 advanced with the pressure increase in the pressure control chamber 4D or with the pressure increase in the fourth chamber 4E and the valve portions 442, 443, 444 that bring the first chamber 4A and the second chamber 4B into communication by the advance of the piston 445. Further, the stroke sensor 72 may be replaced by an operation force sensor, and in the control, the operation force on the brake pedal 10 may be used instead of the stroke amount. Further alternatively, the both sensors may be used.

Furthermore, in the foregoing embodiments, the stroke sensor 72 constituting an input piston moving amount detecting section for detecting the moving amount of the input piston 13 comprises a sensor that is arranged in the vicinity of the brake pedal 10 for detecting the stroke amount of the brake pedal 10. However, such an input piston moving amount detecting section can be constituted as a sensor that is arranged in the vicinity of the input piston 13 for directly detecting the moving amount (stroke amount or operation amount) of the input piston 13.

Moreover, in the foregoing embodiments, a braking operation member that transmits the operation force by the driver to the input piston 13 comprises the brake pedal 10. However, the braking operation member is not limited to the brake pedal 10 and may be constituted as, for example, brake lever or brake handle. Further, it is needless to say that the technical concept in the present invention is applicable where the vehicle brake device (friction brake device B) in the present embodiment is applied to motorcycles or other vehicles.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vehicle brake device for supplying brake fluid to a wheel cylinder of a friction brake provided for a wheel to generate a friction brake force by the friction brake, the vehicle brake device comprising:
   a master cylinder;
   a master piston arranged in the master cylinder slidably in an axial direction and composed of a pressurizing piston portion defining together with an internal surface of the master cylinder a master chamber for pressurizing the brake fluid supplied to the wheel cylinder, a servo pressure receiving portion defining together with the internal surface of the master cylinder a servo chamber filled with the brake fluid, and a protruding portion protruding rearward from a rear end of the pressurizing piston portion;
   an input piston arranged at a rear part in the master cylinder slidably in the axial direction, being behind the protruding portion to be separated from the protruding portion, and defining together with the internal surface of the master cylinder and the protruding portion a separation chamber filled with the brake fluid;
   an input piston moving amount detecting section that detects the moving amount of the input piston;
   a servo pressure generating section that generates a servo pressure acting in the servo chamber, in dependence on the moving amount of the input piston detected by the input piston moving amount detecting section;
   a master piston moving amount calculating section that calculates the moving amount of the master piston based on the moving amount of the input piston detected by the input piston moving amount detecting section; and
   a contact inferring section that infers the contact of the input piston with the protruding portion based on the moving amount of the input piston detected by the input piston moving amount detecting section and the moving amount of the master piston calculated by the master piston moving amount calculating section.

2. The vehicle brake device as set forth in claim 1, wherein a first distance reference based on which the input piston is inferred by the contact inferring section to have changed from the contact with the master piston to the separation from the master piston is set to be larger than a second distance reference based on which the input piston is inferred by the contact inferring section to have changed from the separation from the master piston to the contact with the master piston.

3. The vehicle brake device as set forth in claim 1, wherein the contact inferring section includes:
   a separation distance calculating section that calculates a separation distance between the input piston and the protruding portion of the master piston based on an initial separation distance between the input piston and the protruding portion of the master piston, the moving amount of the input piston and the moving amount of the master piston; and
   wherein the contact inferring section infers the contact of the input piston with the master piston if the separation distance calculated by the separation distance calculating section is a first predetermined value or shorter, and infers the separation of the input piston from the master piston if the separation distance is a second predetermined value or longer.

4. The vehicle brake device as set forth in claim 1, wherein the master piston moving amount calculating section includes:
   a target friction brake force calculating section that calculates a target friction brake force based on at least the moving amount of the input piston;

a demand wheel cylinder pressure calculating section that calculates a demand wheel cylinder pressure to be applied to the wheel cylinder, based on the target friction brake force calculated by the target friction brake force calculating section; and a brake fluid supply quantity calculating section that calculates a brake fluid supply quantity to be supplied to the wheel cylinder, based on the demand wheel cylinder pressure calculated by the demand wheel cylinder pressure calculating section;

wherein the master piston moving amount calculating section calculates the moving amount of the master piston based on the brake fluid supply quantity calculated by the brake fluid supply quantity calculating section.

5. The vehicle brake device as set forth in claim 4, wherein the master piston moving amount calculating section includes:

a first data map representing the relation between demand wheel cylinder pressure and brake fluid supply quantity for enabling the brake fluid supply quantity calculating section to derive the brake fluid supply quantity based on the demand wheel cylinder pressure calculated by the demand wheel cylinder pressure calculating section; and a second data map representing the relation between brake fluid supply quantity and master piston moving amount for enabling the master piston moving amount calculating section to derive the master piston moving amount based on the brake fluid supply quantity derived from the first data map.

6. The vehicle brake device as set forth in claim 1, further comprising:

an antilock brake system that is connected between the master cylinder and the wheel cylinder and that controls the supply of the brake fluid to the wheel cylinder for preventing the wheel from being locked;

a first inferred master pressure calculating section that calculates a master pressure inferred to be generated in the master chamber by using at least a first factor when the input piston is inferred by the contact inferring section to be in separation from the master piston; and a second inferred master pressure calculating section that calculates the master pressure inferred to be generated in the master chamber by using at least a second factor differing from the first factor when the input piston is inferred by the contact inferring section to be in contact with the master piston;

wherein the master pressures inferred by the first and second inferred master pressure calculating sections are used in controlling the antilock brake system.

7. The vehicle brake device as set forth in claim 6, wherein the second inferred master pressure calculating section calculates the master pressure when the degree of the contact between the input piston and the master piston is inferred to be complete; the vehicle brake device further comprising:

a third inferred master pressure calculating section that calculates the master pressure inferred to be generated in the master chamber by using at least a third factor differing from the first and second factors when the input piston is inferred by the contact inferring section not to be completely separated from the master piston and when the degree of the contact between the input piston and the master piston is inferred not to be complete;

wherein the master pressures inferred by the first to third inferred master pressure calculating sections are used in controlling the antilock brake system.

8. A vehicle brake device for supplying brake fluid to a wheel cylinder of a friction brake provided for a wheel to generate a friction brake force by the friction brake, the vehicle brake device comprising:

a master cylinder;

a master piston arranged in the master cylinder slidably in an axial direction and composed of a pressurizing piston portion defining together with an internal surface of the master cylinder a master chamber for pressurizing the brake fluid supplied to the wheel cylinder, a servo pressure receiving portion defining together with the internal surface of the master cylinder a servo chamber filled with the brake fluid, and a protruding portion protruding rearward from a rear end of the pressurizing piston portion;

an input piston arranged at a rear part in the master cylinder slidably in the axial direction, being behind the protruding portion to be separated from the protruding portion, and defining together with the internal surface of the master cylinder and the protruding portion a separation chamber filled with the brake fluid;

an input piston moving amount detecting section that detects the moving amount of the input piston;

a reaction force generating unit that communicates with the separation chamber and that generates a reaction force pressure depending on the moving amount of the input piston;

a servo pressure generating section that generates a servo pressure acting in the servo chamber, in dependence on the moving amount of the input piston detected by the input piston moving amount detecting section;

a reaction force pressure detecting section that detects the reaction force;

a servo pressure detecting section that detects the servo pressure; and a contact inferring section that infers the contact of the input piston with the protruding portion based on the reaction force pressure detected by the reaction force pressure detecting section and the servo pressure detected by the servo pressure detecting section.

9. The vehicle brake device as set forth in claim 8, wherein a first distance reference based on which the input piston is inferred by the contact inferring section to have changed from the contact with the master piston to the separation from the master piston is set to be larger than a second distance reference based on which the input piston is inferred by the contact inferring section to have changed from the separation from the master piston to the contact with the master piston.

10. The vehicle brake device as set forth in claim 8, wherein the contact inferring section includes:

a data map defining at least two contact/separation inferring reference curves that have predetermined relations between reaction force pressure and servo pressure; and wherein the contact inferring section infers the contact of the input piston with the protruding portion based on one of the at least two contact/separation inferring reference curves and infers the separation of the input piston from the protruding portion based on the other of the at least two contact/separation inferring reference curves.

11. The vehicle brake device as set forth in claim 8, further comprising:

an antilock brake system that is connected between the master cylinder and the wheel cylinder and that controls the supply of the brake fluid to the wheel cylinder for preventing the wheel from being locked;

a first inferred master pressure calculating section that calculates a master pressure inferred to be generated in the master chamber by using at least a first factor when the input piston is inferred by the contact inferring section to be in separation from the master piston; and a second inferred master pressure calculating section that calculates the master pressure inferred to be generated in the master chamber by using at least a second factor differing from the first factor when the input piston is inferred by the contact inferring section to be in contact with the master piston;

wherein the master pressures inferred by the first and second inferred master pressure calculating sections are used in controlling the antilock brake system.

12. The vehicle brake device as set forth in claim 11, wherein the second inferred master pressure calculating section calculates the master pressure when the degree of the contact between the input piston and the master piston is inferred to be complete; the vehicle brake device further comprising:

a third inferred master pressure calculating section that calculates the master pressure inferred to be generated in the master chamber by using at least a third factor differing from the first and second factors when the input piston is inferred by the contact inferring section not to be completely separated from the master piston and when the degree of the contact between the input piston and the master piston is inferred not to be complete;

wherein the master pressures inferred by the first to third inferred master pressure calculating sections are used in controlling the antilock brake system.

* * * * *